(12) United States Patent
Srivastava et al.

(10) Patent No.: US 7,512,702 B1
(45) Date of Patent: Mar. 31, 2009

(54) METHOD AND APPARATUS PROVIDING HIGHLY SCALABLE SERVER LOAD BALANCING

(75) Inventors: Sunil K. Srivastava, Fremont, CA (US); Daniel C. Tappan, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 700 days.

(21) Appl. No.: 10/199,760

(22) Filed: Jul. 19, 2002

Related U.S. Application Data

(63) Continuation-in-part of application No. 10/102,287, filed on Mar. 19, 2002, now Pat. No. 7,047,315.

(51) Int. Cl.
*G06F 15/173* (2006.01)

(52) U.S. Cl. ............... 709/238; 709/239; 709/240; 709/242; 370/236

(58) Field of Classification Search ......... 709/238–240, 709/242; 370/236
See application file for complete search history.

(56) References Cited

U.S. PATENT DOCUMENTS

| | | | | |
|---|---|---|---|---|
| 5,774,668 | A * | 6/1998 | Choquier et al. | 709/223 |
| 5,774,670 | A * | 6/1998 | Montulli | 709/227 |
| 6,119,143 | A * | 9/2000 | Dias et al. | 709/201 |
| 6,351,775 | B1 * | 2/2002 | Yu | 709/238 |
| 6,374,300 | B2 * | 4/2002 | Masters | 709/229 |
| 6,424,992 | B2 * | 7/2002 | Devarakonda et al. | 709/203 |
| 6,466,985 | B1 * | 10/2002 | Goyal et al. | 709/238 |
| 6,772,211 | B2 * | 8/2004 | Lu et al. | 709/226 |
| 6,856,991 | B1 * | 2/2005 | Srivastava | 707/10 |
| 6,865,680 | B1 * | 3/2005 | Wu et al. | 726/12 |
| 6,904,018 | B2 * | 6/2005 | Lee et al. | 370/238 |
| 6,959,420 | B1 * | 10/2005 | Mitchell et al. | 715/745 |
| 6,967,927 | B1 * | 11/2005 | Dugeon et al. | 370/236.1 |

(Continued)

OTHER PUBLICATIONS

E. Rosen et al., "Multiprotocol Label Switching Architecture," IETF RFC 3031, Jan. 2001.

(Continued)

*Primary Examiner*—Alicia Baturay
(74) *Attorney, Agent, or Firm*—Hickman Palermo Truong & Becker LLP

(57) ABSTRACT

A method and apparatus providing highly scalable server load balancing are disclosed. Data packets from a client are routed through one or more routers to a server load balancer, which is selected from among a plurality of server load balancers in a network. In response to receiving a request packet, a particular server site to process the client request is selected. A first path to a second router associated with the particular server site, and a second path to a server load-balancing device associated with the second router, are determined. A mapping of flow identifying information, associated with the packet, to a first label value that identifies the first path and to a second label value that identifies the second path, is created. The first label value and the second label value are stored in the packet. All subsequent packets associated with the client request are forwarded to the server load-balancing device based on looking up the first label value and second label value in the mapping. As a result, a network is scalable to process and load-balance numerous client requests, which are efficiently routed to the site, server load-balancer, and server that are handling the request.

22 Claims, 22 Drawing Sheets

U.S. PATENT DOCUMENTS

| | | | |
|---|---|---|---|
| 7,003,565 B2* | 2/2006 | Hind et al. | 709/224 |
| 7,031,266 B1* | 4/2006 | Patel et al. | 370/254 |
| 7,047,315 B1* | 5/2006 | Srivastava | 709/238 |
| 7,082,102 B1* | 7/2006 | Wright | 370/229 |
| 7,088,718 B1* | 8/2006 | Srivastava | 370/392 |
| 7,099,915 B1* | 8/2006 | Tenereillo et al. | 709/203 |
| 7,209,977 B2* | 4/2007 | Acharya et al. | 709/240 |
| 7,213,071 B2* | 5/2007 | DeLima et al. | 709/227 |
| 7,225,237 B1* | 5/2007 | Tenereillo | 709/219 |
| 7,321,926 B1* | 1/2008 | Zhang et al. | 709/220 |
| 2002/0065938 A1* | 5/2002 | Jungck et al. | 709/246 |
| 2003/0023669 A1* | 1/2003 | DeLima et al. | 709/203 |
| 2003/0065711 A1* | 4/2003 | Acharya et al. | 709/203 |
| 2005/0149531 A1* | 7/2005 | Srivastava | 707/10 |
| 2006/0130064 A1* | 6/2006 | Srivastava | 718/102 |
| 2006/0233155 A1* | 10/2006 | Srivastava | 370/351 |

OTHER PUBLICATIONS

M. Cieslak, "Web Cache Coordination Protocol V2.0," Jul. 13, 2000.
Cisco Systems, Inc., "Distributed Director—Overview," 2000, 6 pp.
K. Delgadillo, "Distributed Director—White Paper," 1999, 19 pp.
Cisco Systems, Inc., "The Effects of Distributing Load Randomly to Servers" 1997, 18 pp.

* cited by examiner

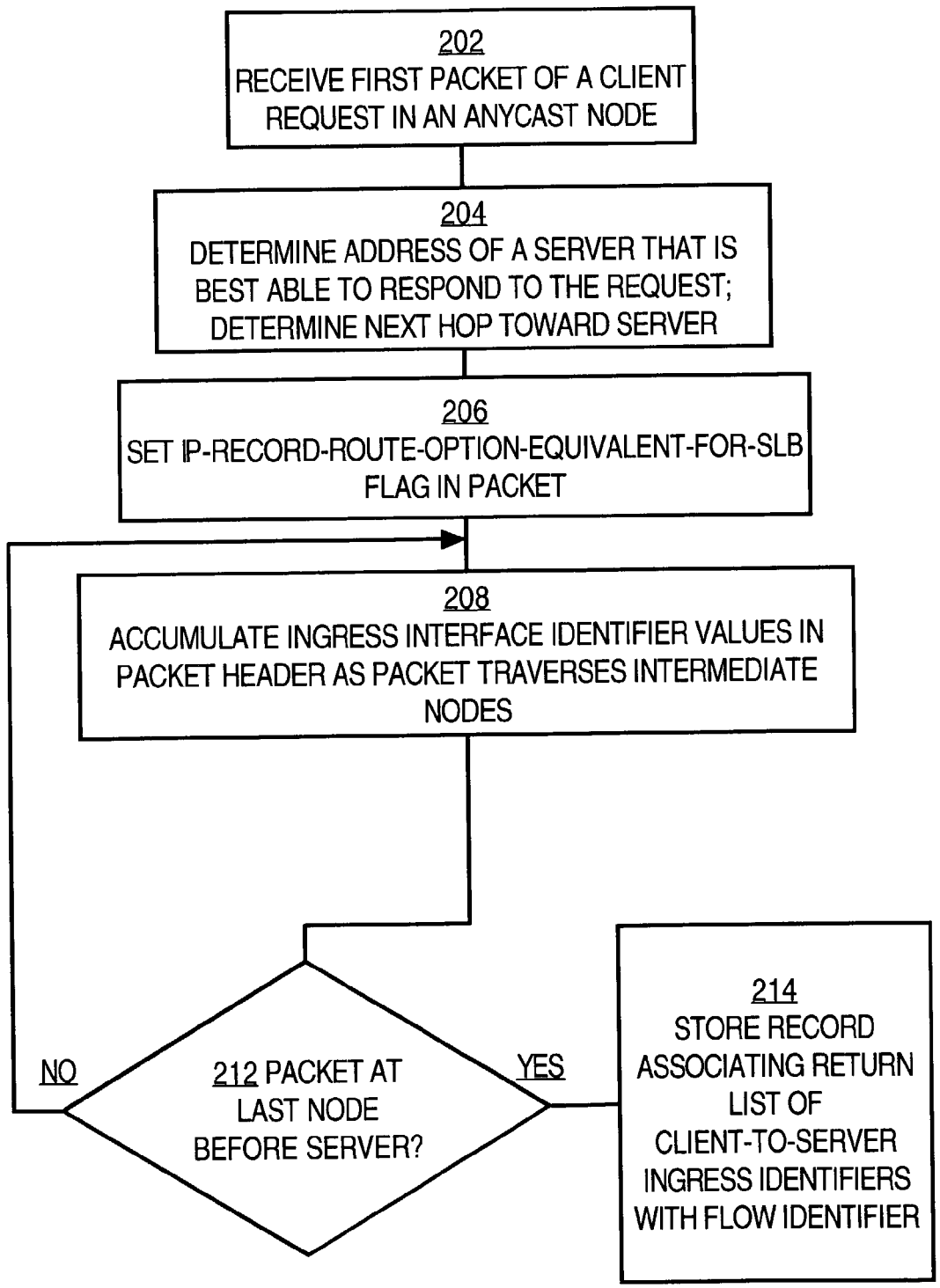

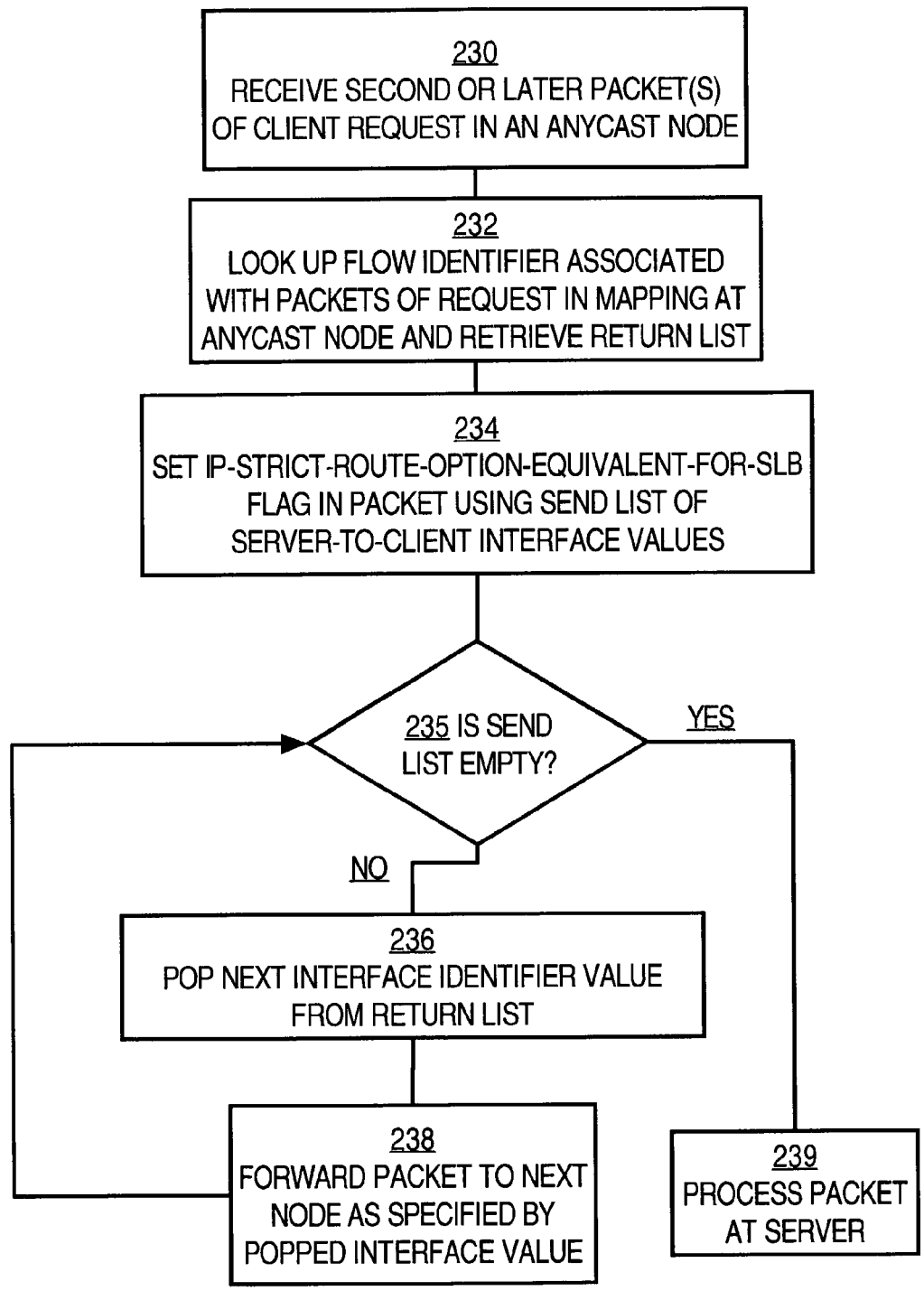

*Fig. 3C*

| 321 CARRY OUT NETWORK ADDRESS TRANSLATION OR OTHER PER-PACKET PROCESSING |
|---|

| 322 ENCAPSULATE SUBSEQUENT PACKET USING TWO-LEVEL STACK OF MPLS LABELS |
|---|

| 324 FORWARD SUBSEQUENT PACKET DIRECTLY TO LAST CONTENT ROUTER |
|---|

*Fig. 6A*

| 604 INSERT UNIQUE CLIENT ID VALUE IN IP PACKET HEADER |
|---|

| 606 STORE RECORD ASSOCIATING A FLOW IDENTIFIER WITH CLIENT ID VALUE AND RETURN LIST |
|---|

Fig. 6B

| 612 INSERT UNIQUE SERVER IDENTIFIER VALUE IN IP PACKET HEADER |
|---|

| 614 STORE RECORD ASSOCIATING A FLOW IDENTIFIER WITH SERVER IDENTIFIER AND SEND LIST |
|---|

METHOD AND APPARATUS PROVIDING HIGHLY SCALABLE SERVER LOAD BALANCING

CROSS-REFERENCE TO RELATED APPLICATIONS

Domestic priority is claimed under 35 U.S.C. §120 as a Continuation-in-Part of prior application Ser. No. 10/102,287, filed Mar. 19, 2002, now U.S. Pat. No. 7,047,315 the entire contents of which are hereby incorporated by reference as if fully set forth herein.

FIELD OF THE INVENTION

The present invention generally relates to data processing in the field of routed data networks. The invention relates more specifically to a method providing highly scalable server load balancing without TCP termination and without keeping flow states.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Load balancing is a process of selectively routing successive client requests to one of a plurality of servers that is then currently best able to service each request. In past approaches, a client request is normally routed on a hop-by-hop basis from its source to a destination router that is communicatively coupled to a hardware or software load-balancing device. The destination router selects one of the load-balancing devices to handle the request. The selected load-balancing device then determines which server should service the request, and forwards the request to that server.

Although this approach is workable, when a plurality of load-balancing devices are organized in a server farm that is distributed over numerous logically or geographically separate sites, the past approach becomes inefficient. There may be a high volume of client requests provided to the last content router before the load-balancing devices, but the last content router is required to decide repeatedly, for all packets in a flow, which load-balancing device should service the request, and then forward the packets to the selected load-balancing device, resulting in delay. Specifically, for each new packet arriving for the same flow, the same content routing and server load-balancing decisions must be carried out.

Load balancing can involve either global load balancing or local load balancing. In global load balancing over the Internet, locating a content site that can service a client request generally involves mapping a host name to an IP address using the Domain Name Service (DNS). Some DNS servers can store multiple IP address entries for a host, and deliver successive mappings based on a round-robin scheme. DNS also enables a client to look up available servers to a particular protocol, and can return server preferences that may assist a client in selecting a particular server. Dynamic DNS can store weight values in server records, so that a server can be selected using a weighted approach. Proximity values obtained using Border Gateway Protocol (BGP) can be used to determine the server that is closest to a particular client. The proximity values can be obtained through the AS Hop Count value through BGP, or hop count values that are obtained using a Layer 3 routing protocol such as DVMRP. Alternatively, round-trip delay time values could be measured by sending ICMP Echo Reply packets and measuring time delay between the ICMP Echo Request and Reply.

A commercial example of a global load-balancing device is Distributed Director, from Cisco Systems, Inc., San Jose, Calif. Distributed Director operates in a DNS mode and an HTTP redirect mode. In DNS mode, Distributed Director maps a host name to one of many IP addresses. A disadvantage of this approach is that many hops may be required before the correct DNS server is discovered and the query is satisfied. Following such hops adds to latency from the client's perspective. Further, certain clients will cache the DNS replies; however, if a DNS server goes down or becomes unavailable, caching may cause a client request to attempt to reach a server that is not responding.

Still other disadvantages include the need for manual configuration of Distributed Directors in the DNS server; latency in that the client caches the mapping for a longer time period than the DNS server allows, such that the server mapping become invalid but the client is not notified; and lack of dynamic amortization of the cost of discovery of mapping.

In HTTP redirect mode, Distributed Director redirects an HTTP client to a nearby HTTP server. The HTTP server is selected by communicating using a Director Response Protocol to agents at the servers. The agents provide network-related metrics, external metrics, internal metrics, and server metrics. Network-related metrics may include round-trip packet delay and network topology information. External metrics may include the distance between a client and the DRP agents at the servers in terms of BGP hop counts. Internal metrics may be the distance between a DRP agent and the nearest BGP router as measured by IGP metrics. Server metrics may be the distance between servers and DRP agents as measured by IGP metrics. A disadvantage of this approach is that it is limited to HTTP.

Local load balancing may involve a Layer 2 rewriting approach or a Layer 3 rewriting approach. A commercial example of a local load-balancing device is Local Director, from Cisco Systems, Inc., San Jose, Calif. The Layer 3 rewriting approach is used when a selected host has only one IP address. The load-balancing device rewrites the destination IP address in all client packets destined for that host with the host IP address. The Layer 2 rewriting approach is used when a plurality of hosts share a single virtual IP address. The load-balancing device rewrites the destination MAC address of the host.

In local load balancing, a particular host may be selected using numerous approaches, including a round robin approach, a weighted server approach, a weighted round robin approach, an approach based on the number of connections of the server, and an approach based on the amount of round-trip delay to each server.

Load balancing devices also have been available in the past from Arrowpoint, Sightpath, Altheon, and other vendors.

All of these approaches have disadvantages when applied in the context of high-demand content networks that provide large amounts of multimedia content to millions of widely distributed clients. The owners or operators of these content networks, known as content providers, need approaches other than load balancing to ensure that all requesting clients receive requested content. Certain kinds of caching may be used to address in this approach. One past approach to caching is Web Content Cache Protocol (WCCP) as defined at the document draft-forster-web-pro-00.txt at domain "wrec.org" on the World Wide Web. A "boomerang" agent is configured to intercept a DNS request message and broadcast the same request to multiple WCCP-enabled DNS caches. The first WCCP DNS cache to send a reply is elected as the responding server, and its server address is returned to the client. However, sending DNS queries to many WCCP DNS caches wastes processing cycles and network resources of those caches that respond more slowly, because their replies are ignored. Thus, the flooding nature of the boomerang protocol creates excessive network traffic and is not scalable.

Further, caching does not solve all problems associated with content providers. Caching approaches deprive content providers of important content management data, such as usage tracking information that may be vital for billing purposes. Further, a caching approach that allows users to be untraceable is no longer acceptable for security reasons. As a result, there is a need for improved approaches to deliver content to clients without the disadvantages of past approaches.

One possible approach for improving content delivery involves configuring routers in a network to transmit content data to more than one client at a time. This improves data distribution efficiency and reduces network congestion. This approach may be implemented using "multicast" communications. In Internet Protocol Version 6 (IPv6), an anycast is communication between a single sender and the nearest of several receivers in a group; the receivers are identified by 27-bit subnet addresses. A multicast is communication between a single sender and all receivers in a multicast group, and a unicast is communication between a single sender and a single receiver in a network.

Labeling mechanisms offer other ways of distributing data in a network more efficiently. In a normally routed data network, frames of data pass from a source to a destination in a hop-by-hop basis. In this context, a "hop" represents a specific network data processing device, such as a router. Transit routers evaluate each frame and perform a route table lookup to determine the next hop toward the destination. Typically, the Layer 3 header of a frame is evaluated in this step. "Layer 3" refers to one of the logical communication layers defined in the Open Systems Interconnect (OSI) reference model. This evaluation process tends to reduce throughput in a network because of the intensive processing steps that are needed to process each frame. Although some routers implement hardware and software switching techniques to accelerate the evaluation process by creating high-speed cache entries, these methods rely upon the Layer 3 routing protocol to determine the path to the destination.

However, such routing protocols have little, if any, visibility into characteristics of the network at other layers, such as quality of service, loading, or the identity of a particular content server or other data source that is servicing a source device. To address these issues, multi-protocol label switching (MPLS) enables devices to specify paths in the network based upon quality of service or bandwidth needs of applications.

With MPLS, an edge label switch router (edge LSR) creates a label and applies it to packets. The label is used by label switch routers (LSRs), which may be switches or routers, to forward packets. The format of the label varies based upon the network media type. In one approach, in a LAN environment, the label is located between the Layer 2 header and Layer 3 header of a packet. A label-switched path is a path defined by the labels through LSRs between end points. A label virtual circuit (LVC) is an LSP through an asynchronous transfer mode (ATM) system. In ATM systems, cells rather than frames are labeled.

Each LSR maintains a label forwarding information base (LFIB) that indicates where and how to forward frames with specific label values. In one implementation, each LFIB entry comprises an association of values that identify an incoming interface, incoming label, destination network, outgoing interface, and outgoing label. When a LSR receives a frame from a particular incoming interface that bears a label, the LSR looks up the incoming interface value and incoming label value in the LFIB. If there is a match, the LSR routes the frame to the destination network identified in the matching entry, on the outgoing interface, and replaces the incoming label of the frame with the outgoing label. This process is repeated at each successive LSR in a label-switched path until an edge LSR at the destination end is reached. At this router, known as an egress edge LSR, all label information is stripped and a standard frame is passed to the destination. Because each LSR in that path could switch the frame based upon content in the LFIB and did not need to perform the usual routing operations, the frame is handled more quickly.

An implementation of MPLS is generally structured using a forwarding component and a control component (or "control plane"). The forwarding component uses labels carried by packets and the label-forwarding information maintained by an LSR to perform packet forwarding. The control component is responsible for maintaining correct label-forwarding information among a group of interconnected label switches.

While MPLS has many applications, including quality of service management, traffic engineering, establishing and managing virtual private networks, provisioning, managing IP of any protocol, etc., it has no presently known applicability to server load balancing.

Still another problem is that in the past, global server load-balancing and local server load-balancing have been performed by a single server load-balancing device ("SLB device") that is responsible for all load-balancing work for a data center or site. In this arrangement, the SLB device represents a traffic choke point. It is a limiting factor when traffic scales to thousands or millions of requests in a specified time.

Based on the foregoing, broadly stated, there is a need for an improved network load balancing approach that is useful in a global (WAN) environment or local (LAN) environment. Further, there is a need for a way to scale one SLB device into multiple SLB devices.

There is a particular need for a load balancing approach that is appropriate for use in high-demand, high-volume content networks.

It would be advantageous to have a load-balancing approach that can make use of existing network protocols to carry load-balancing information.

There is a need for a way to indicate the decision for future flows. There is a need for a way to route the flow of a client request to a selected server load-balancing device more directly and rapidly. There is also a need for an approach that can solve these problems while remaining backward-compatible with existing load-balancing technology.

Another deficiency of past approaches is that they fail to support "stickiness" of clients to servers. When a client makes multiple related requests for service, such related subsequent requests are referred to herein as "sticky" content requests because it is desirable to logically attach the requesting client to the same server, even though some of the network protocols that are conventionally involved in such client-server communications are connection-less, and do not support a persistent connection of the client to the server.

In past approaches, flow states have been tracked by storing tables of the "5-tuple" of Layer 4 values (source IP address, source port value, destination IP address, destination port value, and protocol identifier), which uniquely identify flows, in association with server identifier values. These tables provide a useful mapping of a client request flow to a specific server, and are generally required to carry out Layer 3 or Layer 2 network address translation for local server load-balancing, and sometimes for global server load-balancing if one or more intermediate routes are also carrying out global server load-balancing. However, these values have been stored at nodes such as routers at the expense of complexity and processing overhead.

To address this problem, in an embodiment, a mapping of a client identifier to a server identifier is stored at the client side and server side in cookies. The cookies enable a device to determine if a new request has a past association with previous flows or a previously selected server. In order to read the cookie data, the client connection is TCP terminated at the server load-balancing device, and a new client connection is initiated to the chosen server. At the server load-balancing device, a TCP splicing approach is used to combine the original client connection and the new server connection, to preclude the need to repeatedly walk up and down the TCP stack as the mapping is evaluated. In effect, a first connection initiated by the client and terminated at the server load-balancing device, and a second connection initiated by the server load-balancing device and directed to the server, are spliced. This reduces overhead involved in traversing up and down the TCP stack.

However, the processing overhead and intrusiveness of these approaches is undesirable. In particular, these approaches have proven to be not scalable; the performance of TCP termination hardware, which is typically implemented in ASIC chips, is known to degrade significantly when traffic volume involves millions of connections and gigabit-speed traffic is involved. Indeed, the volume of Internet growth is increasing at a rate greater than the rate of improvement in ASIC chip speed. Further, certain of the past approaches only work for HTTP traffic. TCP termination is known to be problematic when it is performed in a device located just in front of a Web server farm in a high-speed, high-volume network, as opposed to near the client side. The amount of traffic per fully qualified domain name (FQDN) service is far less near the client side compared to near the server side.

Thus, there is a need for an improved way to ensure that subsequent packets go to the same load-balancing device or server without requiring termination of a TCP connection to do cookie-based stickiness. There is also a need for a way to support client stickiness in protocols and applications other than HTTP.

SUMMARY OF THE INVENTION

The foregoing needs, and other needs and objects that will become apparent for the following description, are achieved in the present invention. In one aspect, the invention involves a method providing highly scalable server load balancing, in which data packets from a client are routed through one or more routers to a server load balancer, which is selected from among a plurality of server load balancers in a network. In response to receiving a packet of a request from a client, a particular server site to process the client request is selected. A first path through the network to a second router associated with the particular server site, and a second path to a server load-balancing device associated with the second router, are determined. A mapping of flow identifying information, associated with the packet, to a first label value that identifies the first path and to a second label value that identifies the second path, is created. The first label value and the second label value are stored in the packet. All subsequent packets associated with the client request are forwarded to the server load-balancing device based on looking up the first label value and second label value in the mapping. As a result, a network is scalable to process and load-balance numerous client requests, which are efficiently routed to the site, server load-balancer, and server that are handling the request.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A, FIG. 2B, FIG. 2C, and FIG. 2D are flow diagrams illustrating portions of an embodiment of a process of communicating path information from a client to a load-balanced server using "IP-RECORD-ROUTE-OPTION" and "IP-STRICT-ROUTE-OPTION".

FIG. 3C is a flow diagram of a first MPLS path setup approach;

FIG. 6A is a flow diagram of a second approach for providing client stickiness;

FIG. 6B is a flow diagram of additional steps in an approach for providing client stickiness;

DETAILED DESCRIPTION OF THE PREFERRED EMBODIMENT

Figure 1A:
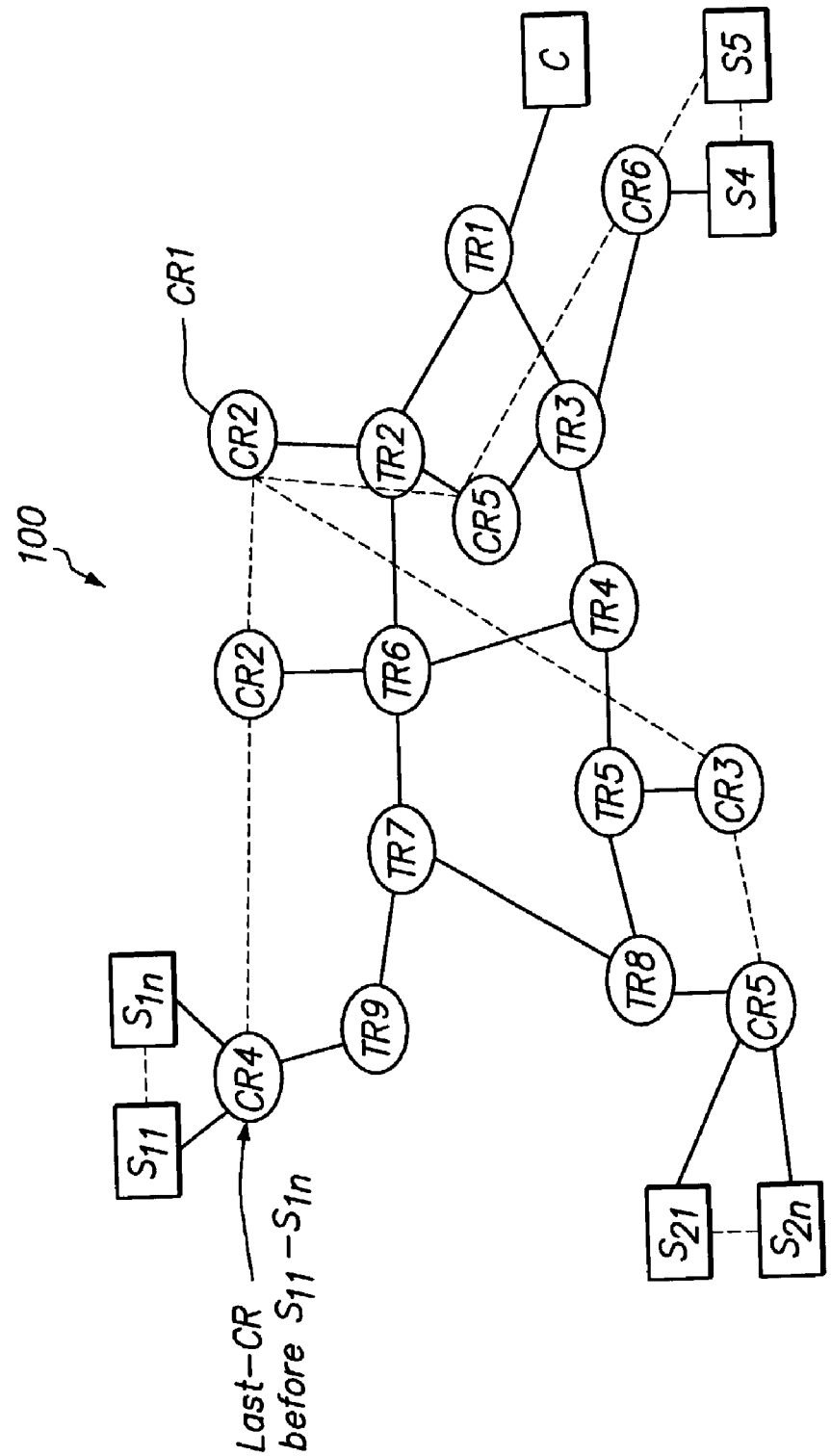
FIG. 1A is a block diagram that illustrates an example network context in which an embodiment of the invention may be used.

A method and apparatus for routing data to a load-balanced server is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The description herein is provided in sections organized as follows:

1.0 Overview
   1.1 Functional Overview
   1.2 Network Context
2.0 Server Load Balancing Approach Using "IP-RECORD-ROUTE-OPTION" And "IP-STRICT-ROUTE-OPTION"
   2.1 General Process Flow
   2.2 Processing With Identical Paths In Both Directions
3.0 Server Load Balancing Approach Using MPLS
   3.1 General Process Flow
   3.2 Control Plane Processing
   3.3 Passing Labels Among Anycast Clouds
4.0 Approaches For Providing Client Stickiness
5.0 Scaling Server Load-Balancing Routers That Do TCP Termination
6.0 Hardware Overview
7.0 Extensions And Alternatives 1.0 Overview
   1.1 Functional Overview Persistent server load balancing, by carrying path identifiers in packet label fields, is described. In one embodiment, upon receiving a first packet that forms a part of a flow from a client relating to a content request, a network node determines which one of N unicast nodes is most suitable to service a request. In this context, a network node normally is a router that is configured to carry out server load balancing, referred to as an "SLB node" herein. The N nodes are members of an Anycast group or load-balanced server farm; thus, the N nodes may be content servers. The packets are TCP/UDP Unicast or Anycast packets. Any suitable process may be used to select a best available server. For example, the Director Response Protocol as used by Cisco Distributed Director may be used.

Subsequent packets of a flow associated with a content request of a client carry path information that intermediate nodes in the network can use to consistently route the packets over the same path to the selected load-balanced server. Such routing may use Anycasting, switching, or label-based routing. When subsequent packets are received at intermediate nodes, labels carried in the packets are used to rapidly switch the subsequent packet requests to the selected unicast node, without conventional route selection decisions. As a result, packets are rapidly forwarded to a specified load-balanced server, and the overhead and delay associated with routing packets hop-by-hop to the selected server are eliminated.

Two approaches for implementing the foregoing are described. In a first approach, the first packet of a client request is received at the first load-balancing node. Receiving the first packet triggers the node to make a server load balancing decision, resulting selecting one of a plurality of servers to service the client request. The node sets a new IP packet flag value termed IP-RECORD-ROUTE-OPTION-EQUIVALENT-FOR-SLB in the packet. The packet is routed to the selected server using hop-by-hop decisions. As such decisions are made, identifiers of the ingress interface used by the packet at each hop are accumulated in an ordered return path list in an IP header field of the packet. When the packet reaches the last node before a server that can respond to the client request, the list is stored in a mapping that associates the list with a client identifier. The first server response packet is switched hop-by-hop and a send path list is accumulated, then stored at the first node after the client in association with a server identifier. The last server and first server need to exchange the accumulated lists. In one approach, the L-CR sends the list with the first reply, and the F-CR can send the accumulated reply list with its second request. For symmetrical paths, the lists are identical in content.

Thereafter, for all other packets in the request and response, the first node and last node set a new IP packet flag termed IP-STRICT-ROUTE-OPTION-EQUIVALENT-FOR-SLB in the packet, and load the packet with the send path list or return path list, respectively. For packets in the send path direction, the first node pops the next interface identifier value from the send path list and forwards the packet to that node which is identified by the interface identifier value; this is repeated iteratively until the packet reaches the last node. The last node pops the server identifier from the list and forwards the packet directly to the server on an IP address contained in the server identifier, or performs network address translation on the server identifier to determine where to forward the packet. The last node can also use a tunneling protocol to send the packet without modifying the destination address.

For packets in the return path direction, the last node pops the next interface identifier value from the return path list and forwards the packet to that node which is identified by the interface identifier value; this is repeated iteratively until the packet reaches the first node. The first node pops the client identifier from the list and forwards the packet directly to the client on an IP address contained in the server identifier, or performs network address translation on the client identifier to determine where to forward the packet.

In another approach, the first packet of a client request is received at a first server load-balancing node, which is typically a router acting as an Anycast node. Receiving the first packet triggers the node to make a server load balancing decision, resulting selecting one of a plurality of servers to service the client request. The packet is routed to the selected server on a path determined using conventional, hop-by-hop routing decisions. When the packet reaches the last node before the selected server, the last node creates or requests an MPLS label and stores a mapping of the label to flow identifying information and interface identifying information for the packet. Thus, the MPLS label uniquely identifies the client-server transaction. One of a plurality of approaches are then used to distribute the MPLS label to all nodes in the path just taken and to associate the MPLS label with the interface identifiers that were accumulated. Thereafter, all other packets in the request are MPLS switched based on the label that has been set up at each node. Accordingly, a flow is consistently fast-switched over a specified path to the same server.

Similarly, the first server response packet is switched hop-by-hop and a return path list is accumulated, then stored at the last node before the client in association with a flow identifier and path label. One of a plurality of approaches are then used to distribute the MPLS label to all nodes in the path just taken and to associate the MPLS label with the interface identifiers that were accumulated. Thereafter, all other packets in the response are MPLS switched based on the label that has been set up at each node.

In one alternative embodiment, a unique server identifier is carried in a second label in a second level of a two-level MPLS label stack. A node at the last hop before the server examines the second label and routes the packet to the server based on the second label. Thus, client stickiness is provided.

In another alternative approach, additional levels of labels may be used where there is a large number of servers, or server sites that are arranged in a multi-level hierarchy.

In either of the two approaches, ultimately the last router forwards packets to the server, and the first router forwards packets to the client, respectively. Because the server or client may be directly or remotely connected to such routers, a node can use either Network Address Translation (NAT) on both directions, or use tunnels to neighboring nodes to determine the specific client address or server address to forward the packets. The same is true if the server load-balancing functionality of a content router is not in each router, and adjacent content routers are overlaid in the network.

As an optimization, a node can assume that packets in flows from client to server and from server to client will follow identical paths. The node can cause the packet to record a route of a flow in only one of the directions, and then use that recorded route as a strict route in the opposite direction. In all the foregoing approaches, each device in a path stores only minimal state information, such as NAT or tunnel information for neighboring devices; by passing a routing path in the EP Option Field, detailed state tracking is not necessary.

1.2 Network Example

FIG. 1A is a block diagram that illustrates an example network in which an embodiment of the invention may be used.

In FIG. 1A, a network 100 comprises a Content Client C that needs to fetch data that is available from a plurality of replicated Content Servers. For example, Content Server set S1, S2, and S3 are part of a server farm at different data sites for a particular fully qualified domain name (FQDN). Content Client C may be a router, switch, gateway, or an endpoint device such as a personal computer, workstation, personal digital assistant, or wireless computing device. A plurality of Transport Routers TR1, TR2, TRn are communicatively coupled to one another and to Content Routers CR1, CR2, CRn and provide Layer 3 network connectivity.

The Content Routers may be viewed as providing a network of nodes that is overlaid over the network of Transport Routers. The Content Routers can be organized in one or more spanning trees for purposes of selecting paths among them. The Content Routers provide logical Layer 7 connectivity.

Each Content Router that is logically adjacent to a Content Server is referred to herein as a "last node before a server," "last node," Last CR or L-CR. A Content Router that is logically near to Content Client C is termed the "first node after the client," "first node," First CR or F-CR. All other Content Routers are termed "intermediate nodes," Transit CRs or T-CRs. Thus, for a given client request, the First CR is the CR that intercepts the flow of packets associated with the client request and is closest to the Content Client, and the Last CR forwards the request to the selected Content Server.

In one embodiment, content routing functionality is integrated into the Transport Routers, but this is not required. Content Routers may or may not be in the forwarding path to a particular server. For example, in the network example of FIG. 1, Content Routers CR4, CR5 are in the forwarding path, whereas CR6 is not.

Each Content Router may direct traffic to and thereby support one or more sets of Content Servers, which are termed Server Sets herein. A Server Set may correspond to one or more Fully Qualified Domain Names ("FQDN"). Each Last CR may be represented by a unique unicast address, and may have an anycast address. In another alternative, each Last CR has a unique virtual unicast address representing a global FQDN that is associated with specific content services. An IP packet directed to a particular Server Set may be forwarded to the address of the Last CR, and the Last CR may forward the packet to the Server Set by carrying out Network Address Translation on the destination address specified in the packet, to result in changing the destination address to the unicast address of the Server Set.

For each Server Set that is supported by a particular CR, a logical spanning tree is maintained by the CRs. Each CR stores one logical spanning tree for each F-CR for each FQDN. The spanning tree can be shared if a Server Set is hosting more than one FQDN. Further, for each branch of the spanning tree, for each FQDN, and each F-CR per FQDN or address in a supported Server Set, a CR maintains a set of stored values or "metrics." The metric values correspond, for example, to the server load, network load, or capacity of a branch of the spanning tree. The metrics may be based on connections, servers or sites having the least connections; connections, servers or sites having the fastest response; connections, servers or sites that are the least loaded and are nearby; and other characteristics. Metrics are aggregated and forwarded upstream to each other CR in a branch.

Each CR maintains a Content Router Information Base ("Content RIB") that stores information useful for purposes of management and control. In one embodiment, the Content RIB comprises associations of Content Identifiers, Metrics, and Output paths. The Content Identifier is a unique bit-string that identifies the granularity at which a content routing decision is to be made. For example, in one embodiment, the Content Identifier comprises a unicast address, or Anycast address, or address and URL, etc. The Metric is the cumulative metric developed from the Content Servers as described above. The Output path identifies a branch of the content spanning tree that is used for forwarding such requests. Alternatively, if the Content RIB is in the Last CR for the associated content, then the Output path is one or more Content Server addresses; the next hop is the next CR on a spanning tree for all CRs.

Certain embodiments herein are described with reference to network nodes, which may be TRs or CRs. These embodiments assume that a certain amount of information infrastructure is present in the network before the techniques used herein are initiated. For example, each node is required to know certain paths to one or more neighboring nodes and to have a spanning tree in memory that identifies the paths. Paths to neighbor nodes may be determined using existing multicast discovery mechanisms, or using WCCP if multicast is not available. In WCCP, a content node sends a Discovery Request Packet on a well-known destination port and destination address on all its interfaces. Neighbor content nodes intercept the packet; by examining contents of the packet, such as the source IP address, the neighbor content nodes learn the identity of their neighbors. Each intercepting neighbor node sends a Discovery Reply Packet to the original node that provides identity information about the responding neighbor node. Each replying node carries out NAT on the original source address and repeats sending the packet on all other interfaces. The original node can use a reverse forwarding check on the source address to build a spanning tree.

2.0 Server Load Balancing Approach Using "IP-Record-Route-Option-Equivalent-for-SLB" and "IP-Strict-Route-Option-EQUIVALENT-FOR SLB"

2.1 General Process Flow

FIG. 2A, FIG. 2B, FIG. 2C, and FIG. 2D are flow diagrams illustrating portions of an embodiment of a process of communicating path information from a client to a load-balanced server using IP packet options that are similar in operation to "IP-RECORD-ROUTE" and "IP-STRICT-ROUTE-OPTION," termed herein the "IP-RECORD-ROUTE-OPTION-EQUIVALENT-FOR-SLB" option and the "IP-STRICT-ROUTE-OPTION-EQUIVALENT-FOR-SLB" option.

Figure 1B:
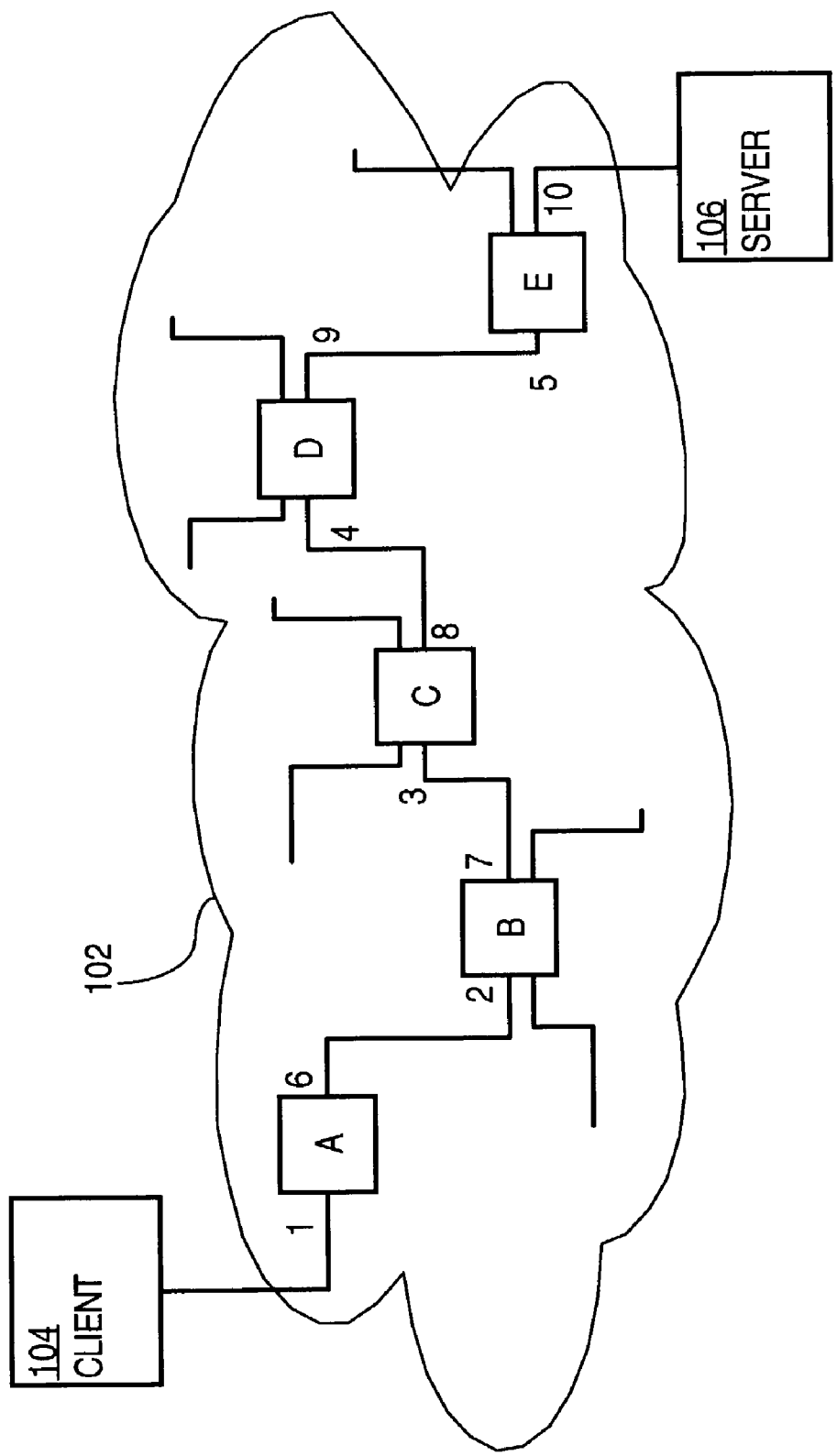
FIG. 1B is a block diagram of example nodes in a network.

In general, in the process of FIG. 2A-FIG. 2D, packets in a flow associated with a client request traverse through an Anycast network, such as the networks of FIG. 1A, FIG. 1B. The packets travel from a client side of the Anycast network to a server side. Both a requesting client and a server that can fulfill requests of the client are connected to the Anycast network. A First-CR or Transit-CR Unicast node of the Anycast network decides which Last-CR or Transit-CR Unicast node to select to service a request from among a plurality of Unicast First-CR, Transit-CR, and Last-CR nodes that are communicatively coupled to the Anycast network. This decision is termed a load balancing decision, and may be carried out as part of a distributed server load balancing process.

Each First-CR, Transit-CR, or Last-CR Anycast node in a path from client to server can determine the ingress link on which the request packet arrived, and the egress link on which to send the packet request. The last hop Last-CR Unicast/Anycast node also knows the server node that has been selected to service the request. Packets from client to server are tagged with ingress and/or egress interface identifier values or labels until the packet request arrives at the selected server. The label values are remembered by the client (a First-CR or Last-CR node) and the server (or Last-CR node), and are used to rapidly forward or label switch subsequent packets, thereby reducing the overall time required to forward packets of a flow from a client to a selected server.

FIG. 1B is a block diagram of example nodes in a network. For purposes of illustrating a clear example, the process of FIG. 2A, FIG. 2B, FIG. 2C, and FIG. 2D is described herein in the context of a simplified, hypothetical network as shown in FIG. 1B.

In the example of FIG. 1B, a client 104 is communicatively coupled through an Anycast network 102 to a server 106. The Anycast network 102 comprises five Anycast nodes A, B, C, D and E. Node A uses Interface 1 as its ingress interface and Interface 6 as its egress interface. Node B uses Interface 2 for ingress and Interface 7 for egress. Node C uses Interface 3 as ingress and Interface 8 as egress. Node D uses Interface 4 as ingress and Interface 9 as egress. Node E uses Interface 5 as ingress and Interface 10 as egress.

Referring now to FIG. 2A, in block 202, a first packet of a client request is received in an Anycast node. Assume, for example, that a first packet from client 104 relating to a request for content from server 106 arrives at node A.

In block 204, the address of a server that is best able to respond to the request is identified. This is also referred to as carrying out a local server load-balancing decision. For example, node A determines that server 106 is the best destination for the packet and subsequent packets in a flow relating to the client request. Arrival of the first packet of a client request triggers the load-balancing decision, which may be carried out using any suitable means for selecting a server that is available to service the client request. Once such a server is selected, the processes of FIG. 2A, FIG. 2B, FIG. 2C, and FIG. 2D ensure that all packets from the client are directed using a fast switch mechanism to the same server. Also in block 204, the next hop toward the selected server is determined. For example, node A determines that node B is the next hop in a routing path toward server 106. Determination of the next hop is carried out using conventional route path selection techniques, i.e., using a slow path or control path approach, and based on any suitable Anycast server selection algorithm. The algorithm may form a combination of distributed global server load balancing decisions and/or Layer 3 routing decisions, based on whether the network is overlayed or not. The packet is then forwarded to the next node.

In block 206, the IP-RECORD-ROUTE-OPTION-EQUIVALENT-FOR-SLB flag value is set in the received packet. Setting this option involves setting a specified flag in the IP header of the packet. This is a new flag value defined herein that does not form a part of the conventional IP header.

In block 208, one or more ingress interface identifier values or labels are accumulated in the IP packet header as the packet traverses intermediate nodes. Each ingress interface identifier value indicates which ingress interface the packet arrived on at the intermediate node. Thus, with IP-RECORD-ROUTE-OPTION set, the IP packet header accumulates an ordered Return List field of ingress interface values, and the packet is forwarded to the next hop. In the example of FIG. 1B, because node A knows that the packet arrived on interface 1, node A inserts Ingress Label 1 into an ordered Return List field of the packet.

In block 212, a test is carried out to determine if the packet has arrived at the last node before the server. In the example of FIG. 1B, the last node before the server is node E. If not, then control returns to block 208, at which point block 208 and block 212 are repeated iteratively until the server node is reached. As a result, Node B inserts Client-to-Server Ingress Label 2 in the Return List, Node C inserts Ingress Label 3, Node D inserts Ingress Label 4, and Node E inserts Ingress Label 5. As a result, the Return List of a packet leaving Node E is an ordered list of Ingress labels 5, 4, 3, 2, and 1. Similarly, a packet leaving Node D has an ordered list of ingress labels 4, 3, 2, and 1. Packets leaving C have an ordered list of ingress labels 3, 2, and 1. Packets leaving B have an ordered list of ingress labels 2, and 1. Packets leaving A have Ingress label 1.

When the packet arrives at the last node before the server, in block 214, a record is created and stored at the last node that associates the Return List of ingress interface labels with information identifying a flow of which the packet is a part. For example, when the packet arrives at node E, that node creates and stores a record that associates the list of client-to-server ingress labels with flow identifying information based on the packet. As a result, node E can later retrieve a list of labels that identify a return path for the packet back to the client. The return path is given by following the list of ingress labels of the path taken by a packet from client to server in inverse order.

Figure 2B:
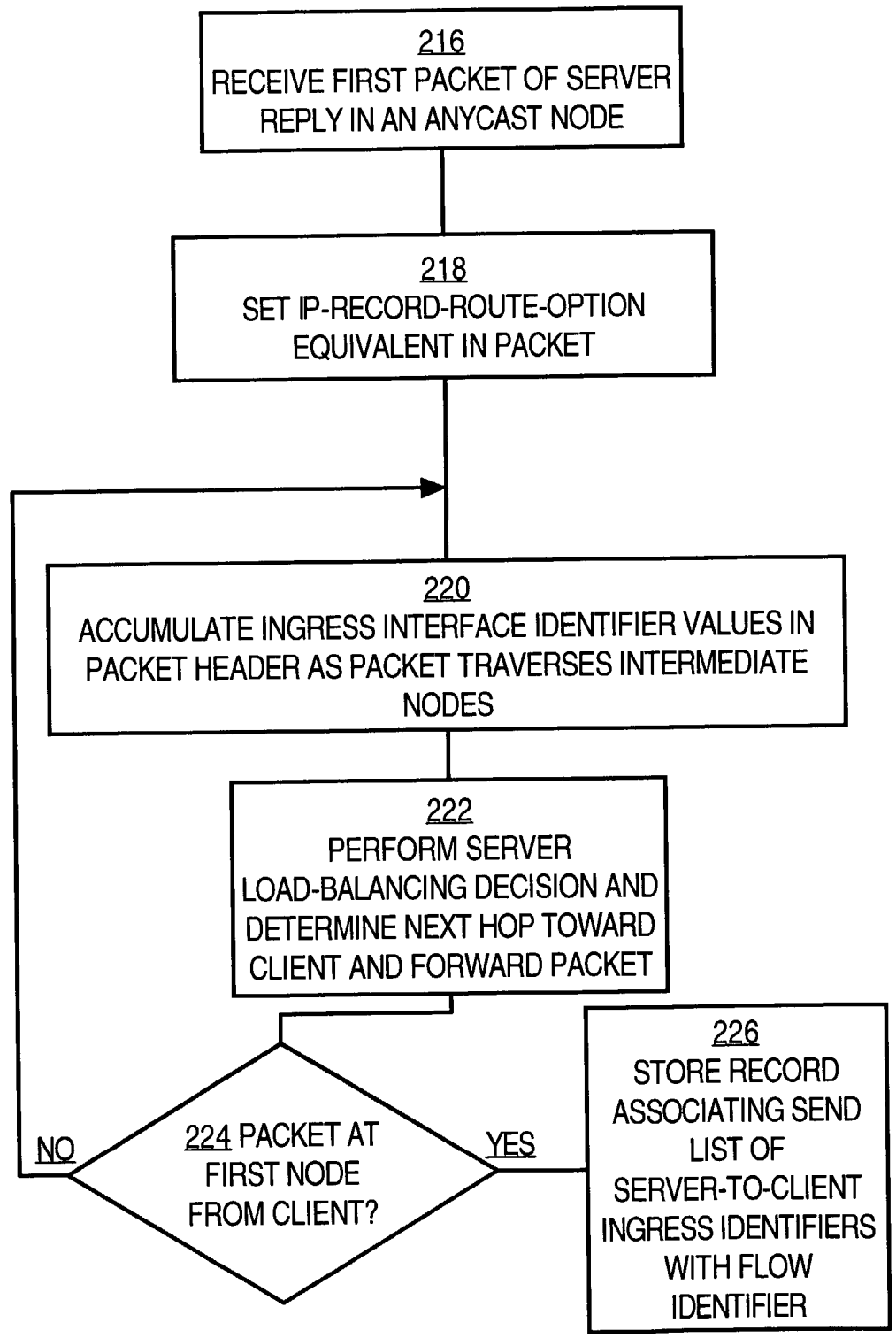

Referring now to FIG. 2B, a reply from the server 106 is subjected to a similar process of control plane processing to result in determining a sending path. In block 216, a first packet of a server reply is received at an Anycast node in the network. In block 218, the EP-RECORD-ROUTE-OPTION-EQUIVALENT-FOR-SLB is set in the packet by the node. In block 220, server-to-client ingress interface identifier values are accumulated in the IP packet header as the packet traverses intermediate nodes on a path from the intermediate nodes toward the client. In one embodiment, an ingress interface label is inserted in an ordered Send List field of the packet. For example, Node E inserts Ingress Label 10, Node D inserts Ingress Label 9, Node C inserts Ingress Label 8, Node B inserts Ingress Label 7, and Node E inserts Ingress Label 6.

In block 222, a distributed global server load-balancing decision is performed, and the next hop from the intermediate node toward the client is determined using conventional route selection mechanisms. Packets carrying such labels are switched in conventional manner after looking up a 5-tuple of flow values and determining an egress path to the client 104. The packet is then forwarded to the next hop.

In block 224, a test is carried out to determine whether the packet arrived at the first node after the client, e.g., node A. If not, then control passes to block 220, at which point block 220, block 222, and block 224 are repeated iteratively until the packet arrives at the client. As a result, a packet that leaves Node E has an ordered list of server-to-client Ingress labels consisting of the value 10. A packet leaving Node D has an ordered list of Ingress labels 9 and 10. Packets leaving C have Ingress labels 8, 9, and 10. Packets leaving B have Ingress labels 7, 8, 9 and 10. Packets leaving A have Ingress labels 6, 7, 8, 9 and 10 in the Send List.

In block 226, the first node after the client creates and stores a file or record that includes information identifying a packet and a copy of the ordered list. For example, the node A stores a 5-tuple of flow values, and the Send List of labels. Thus, the node A can "remember" the path from which server response packets of a particular flow arrived.

Figure 2D:
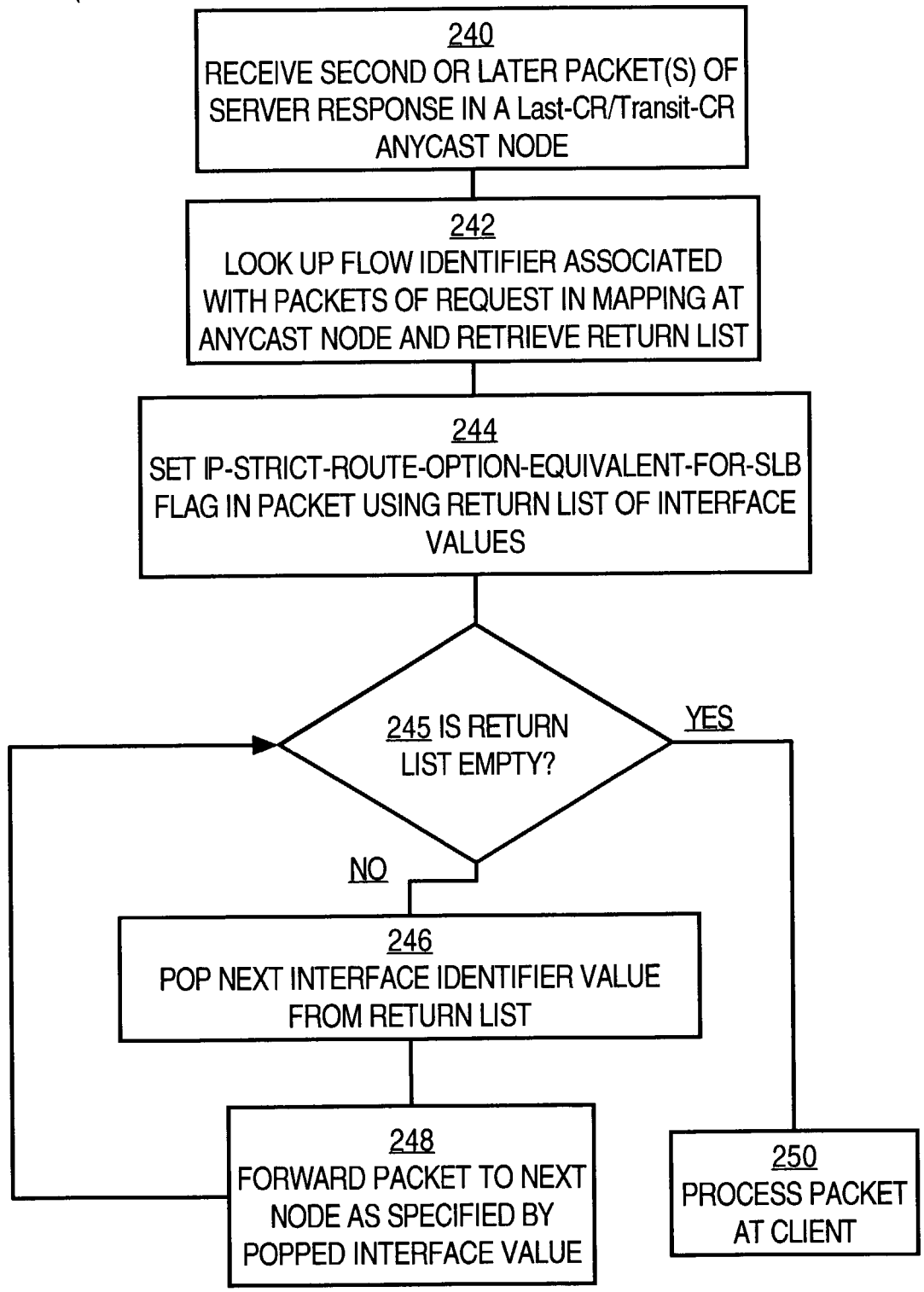

In Internet Protocol a packet may set an IP-STRICT-ROUTE-OPTION flag to instruct and require nodes in the path to forward the packet along a route specified in the packet header. Once the Send List and Return List have been stored at the first node and last node, respectively, they may be used with the IP-STRICT-ROUTE-OPTION to cause all subsequent traffic from client to server to follow the paths specified in the Send List and Return List, thereby ensuring that such traffic is fast-switched and arrives at the same server. As a result, persistent or "sticky" client and server wide area load balancing is achieved. FIG. 2C and FIG. 2D illustrate processing of subsequent packets using such processes.

Referring now to FIG. 2C, in block 230, a second or subsequent packet of the same flow is received from the client at an Anycast node and directed toward the server. For example, node A receives a subsequent packet of the client request. In block 232, in response to receiving the packet, the Anycast node extracts a flow identifier from the received packet and uses it as an index to look up the Send List of path labels in the mapping stored at the node. In one embodiment, the flow identifier comprises an association the 5-tuple of values including source IP address, source port number, destination IP address, destination port number, and protocol.

In block 234, the node sets the IP-STRICT-ROUTE-OPTION-EQUIVALENT-FOR-SLB in the packet, and provides the Send List of server-to-client ingress identifier values as a routing path. Thus, when a second packet of the same flow request travels from client 104 to server 106, node A effectively prepends the ordered list of tag labels 6, 7, 8, 9 and 10 to the packet and orders intermediate nodes to forward the packet along the egress interfaces identified by such tag labels. The server-to-client ingress identifiers are later used as egress interface identifiers for a path from client to server.

Because IP-STRICT-ROUTE-OPTION is set, all packet-forwarding decisions of intermediate nodes are required to forward the packet according to the Send List of interface labels. Blocks 235-238 represent this process. In block 235, a test is carried out to determine whether a list of send path labels in the packet is empty. If not, then in block 236 the next label is popped from the list. In block 238, the packet is forwarded on an egress interface as identified by the popped label. Blocks 235, 236, and 238 iterate as a loop until all labels are popped from the list. The packet has then reached the last node and is processed, as shown in block 239.

Thus, each subsequent Anycast node in a path from client to server pops the next successive tag label from the packet. The popped tag label is used to identify the next egress interface to which the packet needs to be sent. When the packet leaves that egress router, the ordered list remains in the packet but has one less tag label value in it. The process continues until the last Anycast node (a Last-CR or Transit-CR node) receives the packet. At that point, no more tag labels are present in the packet, so the packet is forwarded to the server. As a result this and all subsequent packets in the request are carried over a fast-switched path from client to server as identified in the packet labels.

FIG. 2D illustrates processing for a second packet reply from the server. In block 240, a second or later packet of a server response is received at a Last-CR Anycast node. In block 242, the node looks up a flow identifier and uses it as an index to retrieve the Return List that was previously stored for the first packet of the same flow. In block 244, the IP-STRICT-ROUTE-OPTION-EQUIVALENT-FOR-SLB is set in the packet using the Return List of client-to-server ingress interface path labels to specify the route from the present node to the client. In effect, the Return List is prepended or inserted into the packet based on a lookup of a 5-tuple of flow identifier values. Later the Return List of client-to-server ingress interface path labels is used to specify egress interfaces in a path from server to client.

In block 245, a test is carried out to determine if the list of return path labels is empty. If not, in block 246, the next label in order is popped from the list. In block 248, the packet is forwarded on an egress interface that is identified by the popped label. Control returns to block 245, which is iterated with block 246 and block 248 until all labels are popped. At that point, control passes to block 250, and the packet has reached the client, where it is processed.

In block 326, an Approval Response dialog is generated and displayed. In one embodiment, the Approval Response dialog is a pop-up graphical user interface window that prompts the user to enter an approval selection using radio buttons designated "Yes, approve", "Undecided," or "No, do not approve". The dialog also may include a text entry box in which the user may optionally enter one or more brief comments or reasons about the approval response that is given. In block 328, one of the approval responses is received.

In block 330, a test is performed to determine whether digital signing is enabled for the transportable application. If not, then control passes to block 332, in which the approval response is updated to the database in association with the transportable application, and the display is refreshed to show the response. In one embodiment, responses are displayed using color-coding such that positive approval responses are highlighted in green and negative approval responses are highlighted in red.

Thus, as an example, the second reply packet from the server will have tag labels 5, 4, 3, 2 and 1 representing a return path from server to client. Each Unicast/First-CR/Transit-CR/Last-CR/Anycast node will pop the label and use it to determine which interface to use to forward the packet. This process is iterated over recursively until the last Anycast node is reached. The last packet leaving the last Anycast node for the client will not have any labels since all have been popped by Anycast nodes.

2.2 Processing with Identical Paths in Both Directions

The foregoing processes define a mechanism in which return paths are treated as asymmetric with respect to the forward path, at the expense of doing control processing both for the forward path and the reverse path. Alternatively, the forwarding and return paths may be assumed to be identical except for the direction of travel of the packet. In this alternative, in the processes of FIG. 2A and FIG. 2B, the Anycast nodes can insert labels for both the ingress interface and the egress interface as packets are received and forwarded.

Thus, in this alternative, node A inserts 1 and 6 in packets traveling through it in the sending direction; B inserts 2 before 1 and 7 after 6; C inserts 3 before 2 and 1, and 8 after 6 and 7; D inserts 4 3, 2, and 1, and 9 after 6, 7, and 8; E inserts 5 before 4, 3, 2 and 1, and 10 after 6, 7, 8, and 9. Node E is configured with appropriate instructions to know that the first set of labels represents the return path and should be stored at that node for it to use for packets leaving it that are directed toward the client. Similarly, node A has instructions that enable it to store the second set of labels as the sending path for all future packets.

In this alternative, the first reply from the server is prepended with labels 5, 4, 3, 2, 1 to accomplish fast switching on the return path. Each Anycast node pops the next label in succession, and uses it to determine which interface to forward the packet on, thereby fast switching each return path packet. The first reply also has a second set of labels 6, 7, 8, 9 and 10 after the labels 5, 4, 3, 2 and 1. These labels are stored by the client in a mapping in association with flow identifier values. Based on the mapping, the client can determine how to initiate fast switching of subsequent request packets by looking up flow identifier values of received packets in the mapping and finding the associated return path labels.

As an optimization, it is desirable to carry out control logic processing only for the forward path. In this approach, the first request packet carries no tag labels but participates in accumulating a list of sending path labels. The first reply packet carries the list of sending path labels and an identical set of return path labels. Subsequent request and reply packets carry one set of labels, which are popped in the correct order according to the direction of packet flow.

3.0 Server Load Balancing Approach Using Multi-Protocol Label Switching (MPLS)

3.1 General Process Flow

Figure 3A:
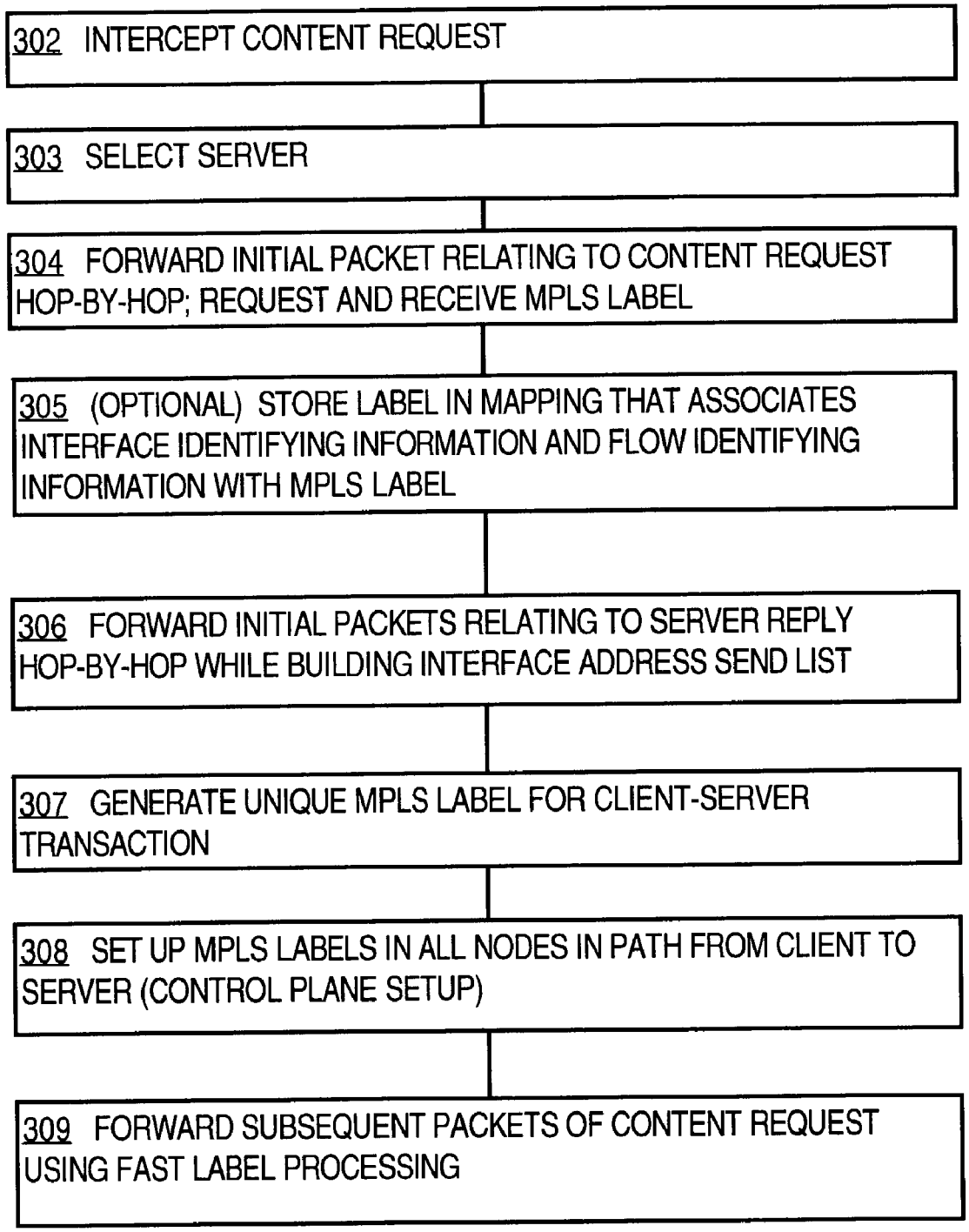
FIG. 3A is a flow diagram illustrating high-level phases involved in a process of carrying out load balancing based on MPLS labels.

FIG. 3A is a flow diagram illustrating high-level phases involved in a process of carrying out load balancing based on multi-protocol label switching (MPLS) labels. For purposes of illustrating an example, the processes of FIG. 3A are described herein with respect to the example network of FIG. 1A. Further, the description herein assumes that a Content Router is serving a single Server Set, and that there is no need to process packets in different contexts. Approaches for supporting multiple Server Sets are described further herein.

Referring now to FIG. 3A, in block 302, a content request is intercepted, e.g., at a node of the network. In block 303, a server is selected to respond to the content request, using conventional server selection mechanisms.

In block 304, the first packet relating to a content request are forwarded hop by hop. Concurrently, flow identifying information for the packet is noted and stored, and the identity of the incoming and outgoing interfaces for the packet are noted. Also concurrently, an MPLS label is requested, and the process waits to receive the requested label from the device that is authoritative for assigning labels. Block 304 may comprise using the IP-RECORD-ROUTE-OPTION to specify a routing label in the packet header, as in FIG. 2A-2D.

In block 305, optionally, when an MPLS label is received, the MPLS label is stored in a mapping at the server load-balancing device that associates the label with flow identifying information and interface identifying information for the initial packets. For example, if the initial packets are Discovery Packets issued as part of a discovery protocol, then intermediate routers visited by the first packet may not be involved in MPLS switching of subsequent packets. In this case, the L-CR decides the shortest MPLS path between the F-CR and the L-CR, and distributes MPLS labels between itself, the F-CR and all routers involved in the MPLS path that may or may not be TRANSIT CRs seen in the first packet. The MPLS label distribution mechanism could piggyback on another protocol, or may be carried out independently. It could form a part of a static MPLS configuration or could be dynamically configured as part of setup of the network between F-CR and L-CR. MPLS paths between F-CR and L-CR could be shared over many flows. However, storing incoming interface values in this manner is optional if T-CRs are also in the MPLS path. If traffic is symmetrical path for both directions, then the identify of the outgoing interface also helps in doing reverse MPLS path switching and also reverse path forwarding.

In block 306, initial packets relating to a server reply to the content request are forwarded using hop-by-hop routing decisions, while building a list of interface values representing a sending path for the request. Block 306 may involve using the IP-RECORD-ROUTE-OPTION to accumulate a Send List of ingress interface values in the packet header, as in FIG. 2A-FIG. 2D.

In block 307, a unique transaction label is generated to identify the current client-server request-response transaction. As subsequent description herein will show, the MPLS label serves as a shorthand reference to a path from client to server.

In block 308, MPLS path labels are set up in all nodes in the path from client to server. Block 308 represents establishing the MPLS control plane in each router or other nodes that participates in a path from the client to the server. In general, block 308 involves distributing the unique transaction label and a corresponding ingress label and egress interface label to each such node. Each node stores this information in its MPLS mappings. Several suitable mechanisms for distributing the labels to nodes are described further herein.

In block 309, subsequent packets of the client request or server response are forwarded using a fast MPLS label switching mechanism using the MPLS data plane features of the intermediate nodes. As a result, a request flow and response flow are rapidly forwarded among intermediate nodes without hop-by-hop decisions, so that a client and load balanced server may efficiently communicate.

Thus, in general, a client request is routed to a server using hop-by-hop decisions for the first packet of the request. As routing decisions are made, ingress interface values are accumulated in an ordered list in the packet. When the packet reaches a server that can respond to the client request, response packets from the server traverse nodes to the client based on following the list of ingress interface values in inverse order. When the server is reached, a unique label value that identifies the server is generated, an MPLS path is set up that associates the server label value with the ingress interfaces that have been collected. Thereafter, all other packets in the request carry the server label, and are MPLS switched based on the server label. This causes all subsequent packets to rapidly arrive at the last node before the selected server.

In one sub-approach, at that last node, a specific selected server among a plurality of servers is identified by a second label in the packet. A node representing the last hop before the selected server examines the second label and routes the packet to the selected server based on the second label, and/or carries out network address translation (NAT) to determine an address to the server.

The interception phase represented by block 302 may be implemented using a domain name redirection approach. In this approach, a request for content provides a FQDN for the content, and is directed to the Content Router that is nearest to the requesting client. Alternatively, a data interception approach may be used where there is tighter integration between Content Routers and Transport Routers. In this approach, the TR is in the forwarding path between the Content Client and Content Server and the destination address that is used in the Content Request. Ensuring that the TR is properly located in the forwarding path may be carried out using policy-based routing, or using WCCP-enabled routers. In this arrangement, a TR can intercept flows with finer granularity; decisions can be made based on Layer 4 or Layer 5 addresses, and more routers are available to make decisions.

A server is selected in the processing phase represented by block 303. For purposes of describing an example, at block 303 it is assumed that a content request has reached the First CR by some means. One goal of the phase of block 303 is to identify which Last CR is appropriate to handle the request.

Figure 3B:
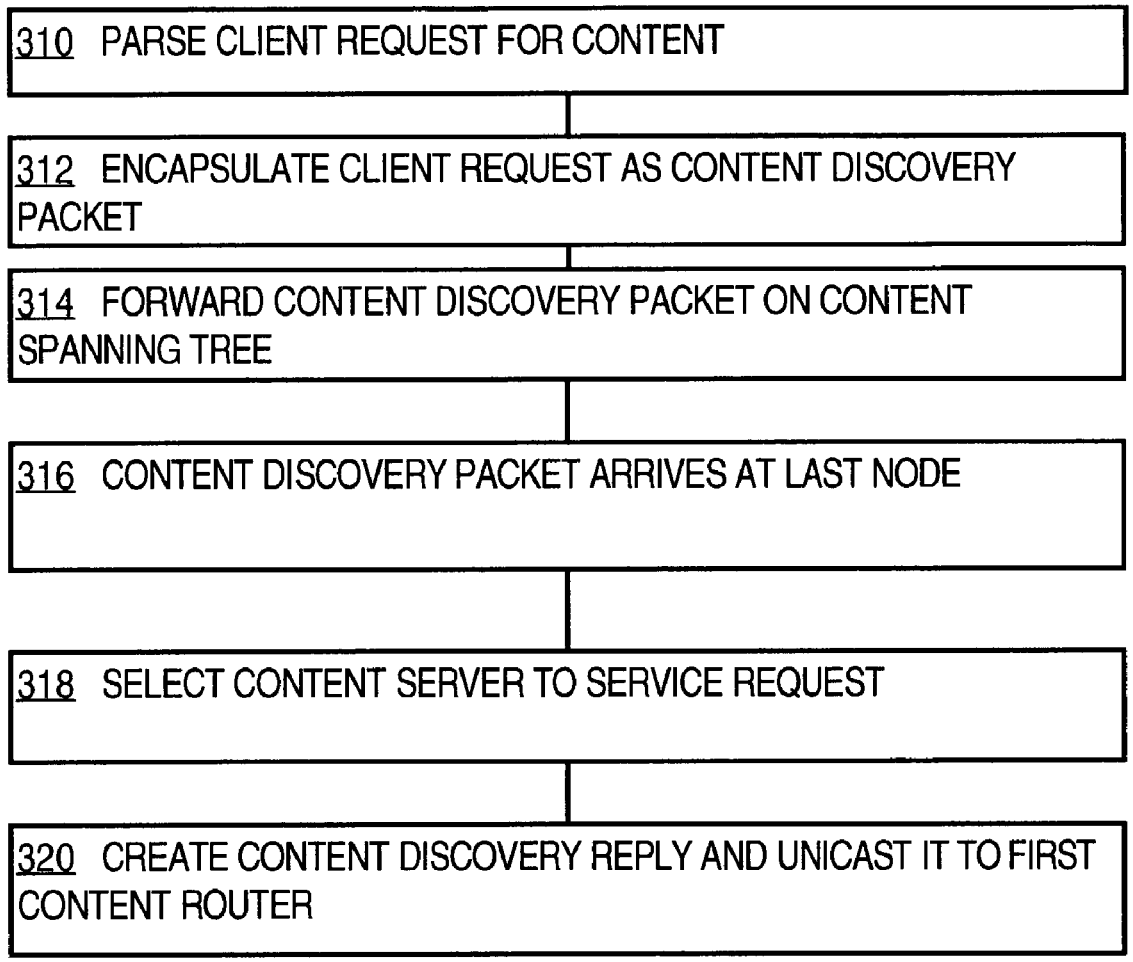
FIG. 3B is a flow diagram of a process of other steps in the process of FIG. 3A.

FIG. 3B is a flow diagram of a process of identifying a Last CR as part of block 303. In block 310, the request is parsed. The First CR parses the request at an appropriate level of granularity to determine how to forward the request. For example, parsing may involve identifying the destination address of the first packet, which may be a TCP packet with the SYN flag set. Alternatively, the TCP connection may be terminated and an HTTP request for a URL and cookie may be parsed. TCP connection termination is avoided if the SYN packet carries a label that indicates a location of the cookie and URL.

In block 312, the request is encapsulated. In one embodiment, the First CR encapsulates the request in a Content Discovery Packet that comprises an address value, request identifier, Layer 4 location identifier, Content Identifier, and Stickiness Identifier. The address value is the address of the First CR and identifies the entry point of the content discovery request. The request identifier provides a transaction identifier that is used to distinguish between multiple pending content discovery requests originating at the same First CR. The location identifier is the value used to route the content request, and can be an IP unicast address or Anycast address. The Content Identifier identifies the requested content, and is information sufficient to enable a Last CR to determine which Content Server should handle the request. For example, the Content Identifier may be a URL. The Stickiness Identifier is information that indicates past client and server associations. Optionally, the Content Discovery Packet can include the initial packet (e.g., TCP SYN packet) to set up the Content Client Request connection.

In block 314, the Content Discovery Packet is forwarded along the content spanning tree, based on the contents of the Content RIB. In an embodiment, as the Content Discovery Packet is received by subsequent CRs, each forwards the Content Discovery Packet according to the Content RIB of that CR. In block 316, the Content Discovery Packet arrives at a Last CR. Thus, the Content Discovery Packet arrives at a CR that is capable of acting as the Last CR because the selected next hop for the Content Discovery Packet is a Content Server.

In block 318, the Last CR selects a Content Server to service the request. Selection may use conventional metrics or algorithms to decide which server is best capable of servicing a request.

In block 320, the Last CR creates a Content Discovery Reply packet, and forwards it directly (i.e., by unicast) back to the First CR. In one embodiment, the Content Discovery Reply packet comprises an address value identifying the Last-CR or the server, L-CR-to-Server Label, and an F-CR-to-L-CR Label. The address value is the address of the Last CR or server. The L-CR-to-Server Label is an MPLS or SYN label that indicates, to the Last CR, which Content Server will process the content request for subsequent packets of a flow. The L-CR-to-Server Label may identify a path to that server or may be a server address. If it is a server address, then the First-CR can use it in lieu of performing NAT, or as an NAT source, in effect, to locate the server.

This information can be used by the Last CR to select a server, and also to carry out Layer 3 or Layer 2 network address translation so that packets leaving the Last CR correctly identify the final server in the destination address portion of the packet header. Layer 3 rewriting is appropriate when all servers in a server farm associated with the Last CR are configured with both a virtual IP address and a real IP address, a technique known as "dispatched mode." Layer 2 rewriting is appropriate when all such servers are configured with identical IP addresses, a technique known as "directed mode." Further, this information precludes the need for the Last CR to track flows by Layer 4 four-tuple values. In addition, for all flows going to the same server, this information can effectively aggregate all flows and prevent flows from occupying entries for NAT purposes.

The F-CR-to-L-CR Label can be used by the First CR to select a path to the Last CR for network address translation for a flow. Further, it precludes the need for the First CR to track flows by Layer 4 four-tuples. For all flows going to the Last CR, this information can effectively aggregate all flows and prevent flows from occupying entries for NAT purposes. The F-CR-to-L-CR Label is an LSP label for the path from the First CR to the Last CR. In one embodiment, if the return path is asymmetrical, then a node may insert a flag indicating that the First CR should send an LSP label for the reverse path. Alternatively, the L-CR-to-Server Label also can be used, if it contains a server address, to perform NAT.

When the First CR receives the Content Discovery Reply, the First CR carries out two processing steps. First, the First CR sets up any state values necessary to track the content flow. For example, the state information may include recording the address of the Last CR, the First CR to Last CR Label, the LSP Label for First CR to Last CR forwarding, and any special processing requirements (such as NAT, TCP termination or splicing) for the flow. Second, if the initial packet in the flow was not carried in the content discovery packet, then the initial packet is forwarded as describe in the phase of block 306 of FIG. 3B, which is described next.

After the discovery phase of block 304, in block 306, the First CR forwards additional packets relating to the same content request. FIG. 3C is a flow diagram of a process of forwarding additional packets that may be used to implement block 306, in one embodiment.

In block 321, per-packet processing, such as network address translation, is applied to a subsequent packet.

In block 322, the subsequent packet is encapsulated using one or more MPLS labels. In a first alternative, block 322 involves placing a single MPLS label in the packet. The label directs the packet to the Last CR that has been identified for the request. A second alternative, which provides client stickiness, is described herein in Section 4.0.

In block 324, the packet is forwarded directly to the Last CR. When the Last CR receives the packet, the only label remaining in the packet is the Last CR to Server label. This label is used to forward the packet to the selected Content Server. In general, no additional packet processing is required, because any required network address translation or TCP splicing operation has been performed by the First CR.

Accordingly, for global and local server load balancing, labels are used to do fast switching of packets to a selected destination after first determining a path to a next hop server or data center. The complete path setup between the first hop SLB node and the last hop SLB node is then be subsequently switched using MPLS Data Plane. Further, MPLS has different ways to implement the control plane to distribute path labels among nodes. Some of the ways it has been proposed to distribute labels are Label Distribution Protocol or Tag Distribution Protocol, OSPF and BGP Extensions, Q-931 Extensions and PIM Extensions.

3.2 Control Plane Setup

Several approaches may be used to carry out configuration of the MPLS control plane, as indicated by block 308 of FIG. 3A, to carry out global and local server load balancing. In particular, the MPLS control plane may be used to distribute MPLS labels. In one approach, this enables nodes outside a particular Anycast network cloud to fast switch packets after MPLS paths have been determined as part of a global and local SLB decisions, as described herein. Certain control plane setup approaches have been described in prior sections, e.g., the description above of using discovery packets that are tied to SYN packets. Alternative approaches to setting up the MPLS control plane are now described.

3.2.1 Using A Priori Labeled Paths.

In this approach, a SLB node knows all paths to all other SLB nodes in advance ("a priori"). Labels to such paths are distributed beforehand using Tag Distribution Protocol (TDP), Label Distribution Protocol (LDP), or extensions to BGP or OSPF. Because there may be many levels and SLB nodes, this method is not considered particular scalable, but it is workable for one level and a few SLB nodes.

If there is a need to support many levels of SLB nodes, then the labels may be stacked in packets as they pass through each SLB node. In this approach, each SLB node only knows MPLS paths to its neighbor SLB nodes. A particular SLB node initiates the MPLS path, and the next hop SLB node then pushes the first hop SLB label onto a label stack in the packet. Alternatively, the next hop SLB node terminates the MPLS path and initiates another one. Initiating another path is carried out either by pushing the first SLB MPLS label onto the stack, or terminating the first SLB node path and pushing the MPLS label for a path to its next SLB node, as selected by a SLB decision.

Terminating the previous SLB path and initiating a new MPLS path is computationally expensive, and pushing the previous MPLS path is more desirable. However, the label pushing approach is limited by the number of stack labels that can be pushed. Further, if this approach is used, all MPLS paths effectively terminate at the SLB node, but the SLB node only knows the path from previous SLB node. The rest of the MPLS labels do not correspond to last paths from previous SLB nodes to last SLB nodes. In essence, they serve as virtual tunnels and are there only so that the last SLB nodes terminate them. Therefore, alternative approaches may be more desirable.

3.2.2 Using Dynamic Labeled Paths

In order to scale to many SLB nodes and many levels of SLB nodes, dynamic MPLS path labeling is preferred. In one specific approach, MPLS labels, requests and replies are carried using TCP SYN packets. Since SYN packets do not carry data, they are well suited for use to distribute labels that are synchronized with TCP flow events for SLB nodes along a SLB MPLS Path. Such distribution may be carried out using SYN packets alone, or discovery packets, or both piggybacked together.

In general, using TDP or LDP to identify a connection to a selected unicast router is not scalable when there are millions of connections per second, which may occur in client-server applications. This approach is not scalable because the first or last anycast node is required to receive a 5-tuple of values relating to a flow, map it to an ingress label or egress label, and create a mapping between the flow 5-tuple and label for both ingress and egress interfaces. The node then propagates the tag label for the egress interface to the next level node, upstream or downstream, depending on which node initiated the tag creation and distribution. Carrying out this process millions of times per second is not a practical approach.

Two approaches may be used to address this problem. In a first approach, prior MPLS paths are used. This approach is best suited to a network topology having a small population of server load balancing or anycast nodes that are not organized in a hierarchy, or arranged in a hierarchy with two or three levels at most. Each device has a pre-defined MPLS path set up that includes another node. If the nodes are arranged in a hierarchy, then the path includes at least an immediate neighbor node. For nodes not arranged in a hierarchy, the path includes all nodes.

Alternatively, to support more hierarchical levels or a larger population of nodes, MPLS stacking of paths may be used, at the cost of storing one MPLS stack frame for each level. This approach is viable because only paths to neighboring nodes are tracked through the stack, because each node is required to decide only which is the next best node in the next level, and because each node is not required to select next best nodes in a complete path all the way to the final server.

In another approach, which is appropriate if sufficient memory required by stack frames is not available, a node at each level initiates and terminates an MPLS path. This approach is workable if the packet is most likely going to be serviced by a node in the next level and not get shunted further downstream. If service is more likely to occur in a much later level, then the overhead involved in initiating and terminating MPLS tunnels may be undesirable.

Figure 3D:
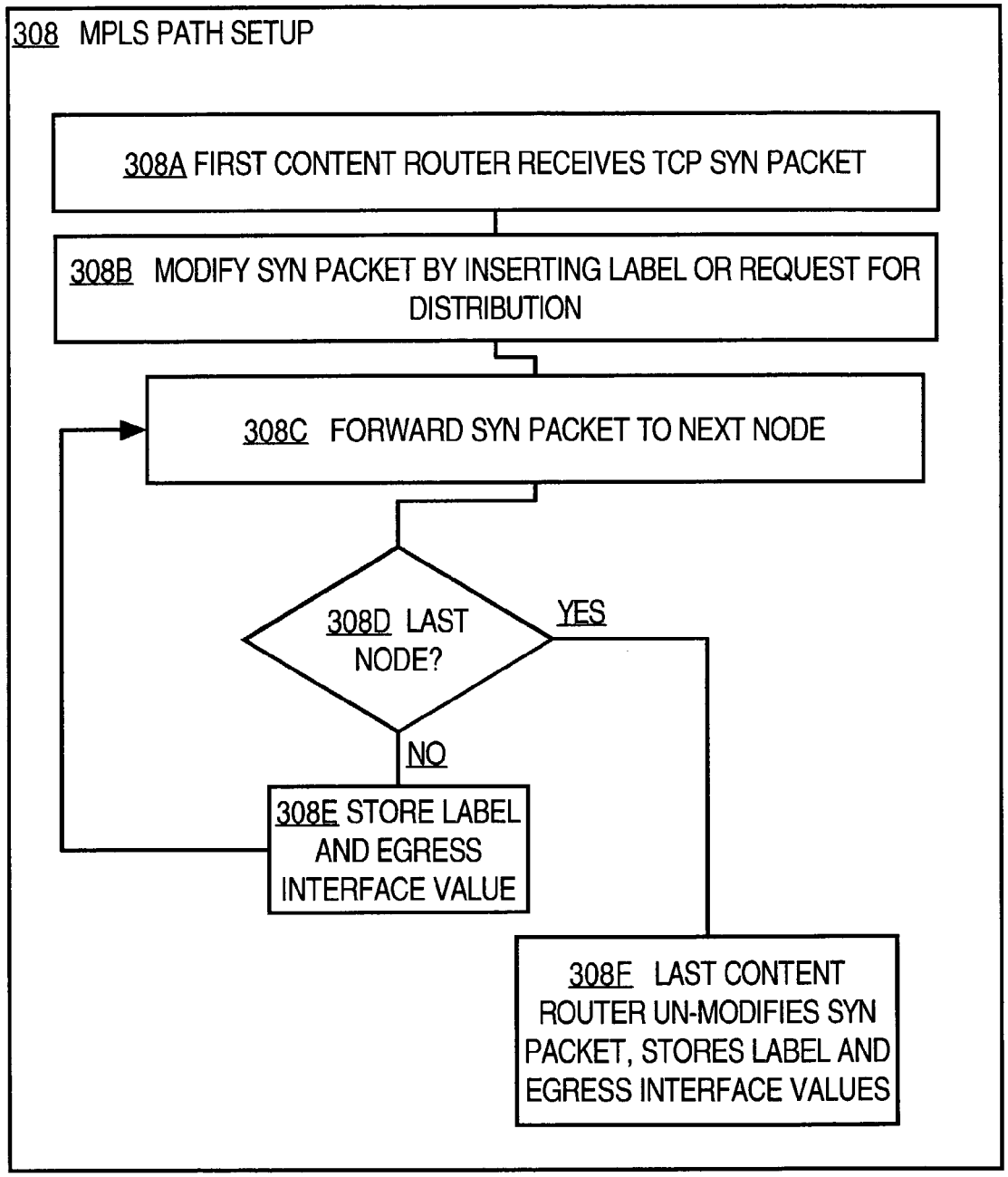
FIG. 3D is a flow diagram of a second MPLS path setup approach.

FIG. 3D is a flow diagram of an approach in which dynamic MPLS labels are used. For purposes of illustrating a simple example, this approach is described herein with respect to FIG. 1B. Assume that client C needs content that is held by server S11. A path from C to S11 traverses content routers CR1, CR2, and CR4. Client C issues a request for content from server S11. At CR1, a first SYN packet of a TCP flow associated with the request is received, as shown by block 308A of FIG. 3D, and triggers a server load balancing decision. Thus, CR1 considers which server should service the client request, and determines that S11 is the correct server.

As defined in TCP, the SYN packet comprises a single bit in the TCP header field and a data portion. In the approach herein, the SYN packet is used to carry MPLS label distribution information by filling the data portion with MPLS label values, without impacting the operation of TCP. Accordingly, in block 308B, CR1 modifies the SYN packet by adding either a label identifying S11 to the packet, or adding a request for distribution of a label identifying S11. The latter is carried out when CR1 knows that S11 is in actually located in a different Anycast cloud that is not reachable in 16 or fewer hops from CR1.

In block 308C, the SYN packet is forwarded to the next node. In block 308D, a node tests whether the packet has reached the last CR before the selected server. If not, the label and an egress interface value are stored in the MPLS mapping of the then-current node, as in block 308E, and control passes to block 308C. Thus the SYN packet travels end-to-end, i.e., from the first node after the client to the last node before the server. As it travels, each node that the packet visits carries out MPLS path setup. This sets up server load balancing information in each node.

Assume that the SYN packet reaches CR4, which is the Last CR before server S11, such that the test of block 308D is true. Control passes to block 308F, in which CR4 un-modifies the SYN packet by extracting the label or the request for distribution. CR4 stores the label and egress interface value in its MPLS mapping. CR4 also generates a SYN ACK packet. The SYN ACK packet is modified to carry a label assignment reply, or a label assignment for the return path. When the SYN ACK packet from CR4 reaches CR1, CR1 also generates a SYN ACK packet in the upstream direction. This upstream SYN ACK packet carries a label assignment reply. In this manner, CR1 and CR4 exchange path label information.

Thereafter, subsequent packets can be fast-switched using the MPLS control plane in each node. At the end of a flow, a FIN packet can tear down the MPLS path in each node for that flow.

Figure 3E:
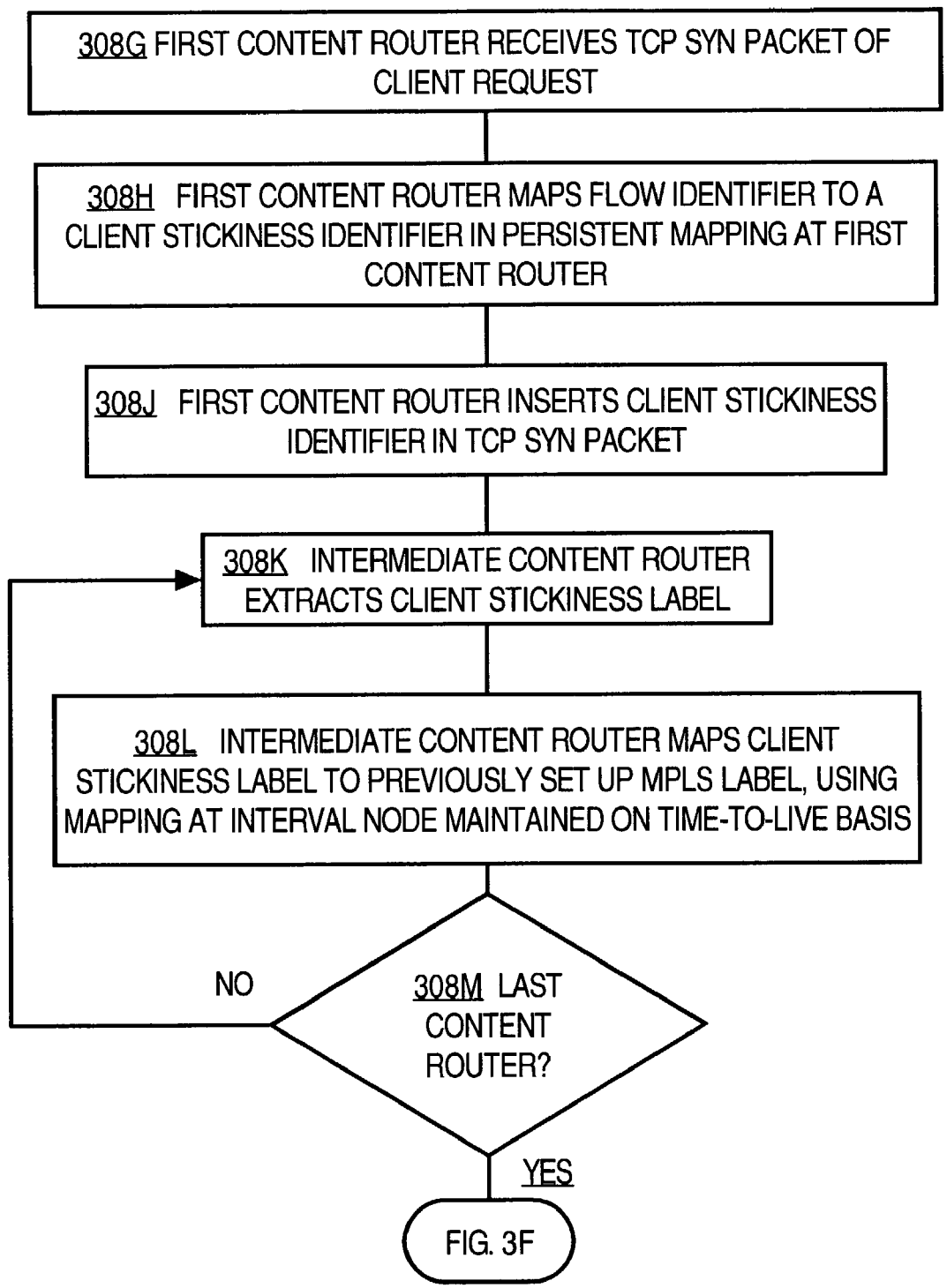
FIG. 3E is a flow diagram of a related approach that provides client stickiness to a particular server.
Figure 3F:
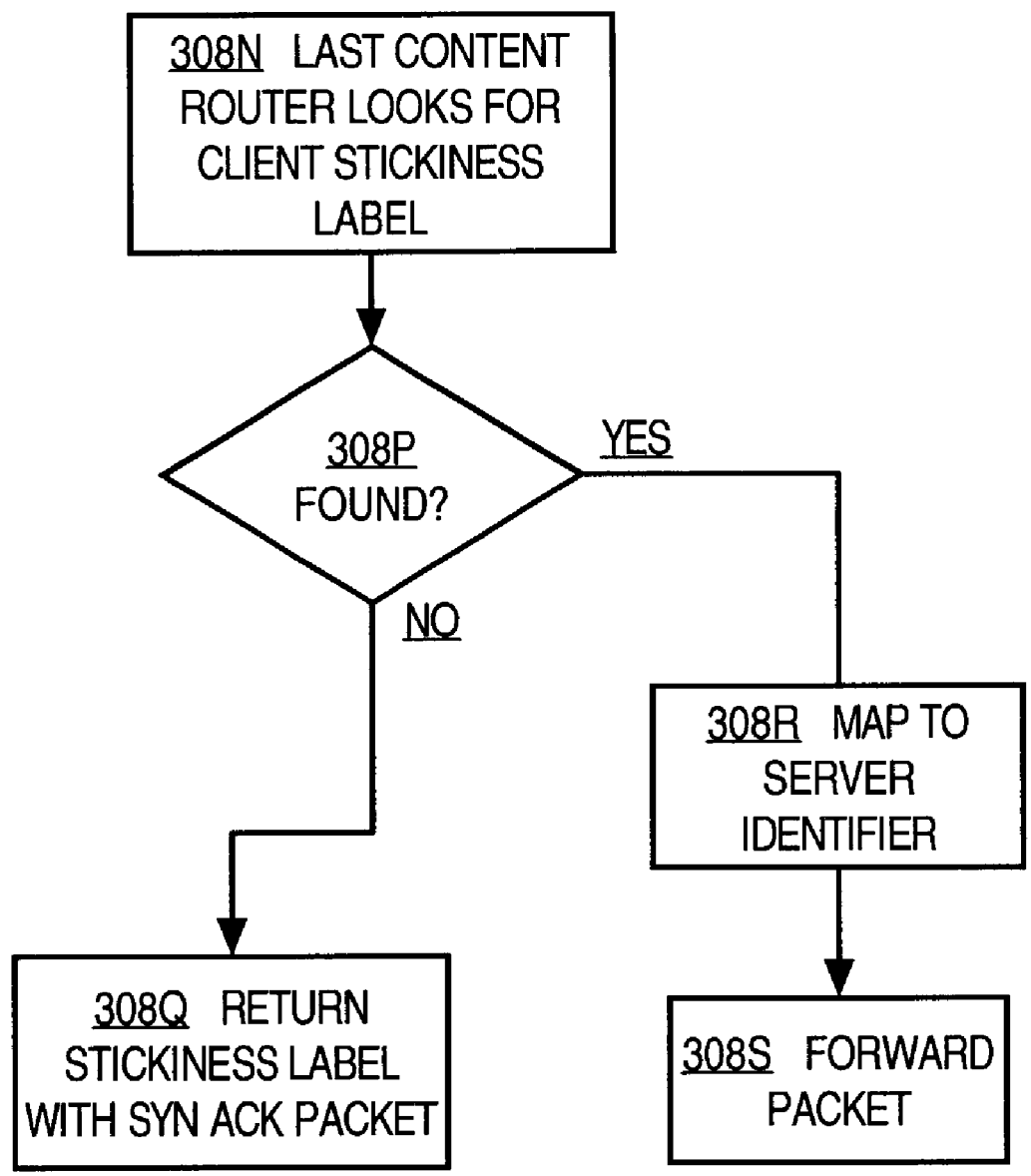
FIG. 3F is a flow diagram illustrating additional steps in the approach of FIG. 3E.

FIG. 3E is a flow diagram of a related approach that provides client stickiness to a particular server; FIG. 3F is a flow diagram illustrating additional steps in the approach of FIG. 3E. In block 308G, a First CR, such as CR1 of FIG. 1A, receives a TCP SYN packet associated with a client request. To enforce client stickiness, CR1 adds a stickiness label to the first SYN packet that is sent from CR1 in the upstream direction toward the server, in a two-step process. CR1 manages a mapping at CR1 that associates flow identifiers with client stickiness labels. Each flow identifier may be a 5-tuple of address, port, and protocol values. In block 308H, CR1 looks up flow identifier values from the received SYN packet in the mapping, and retrieves any corresponding stickiness label. CR1 inserts the client stickiness label in the packet, as shown by block 308G.

Each intermediate CR examines the SYN packet to identify a stickiness label, as shown by block 308K, 308L, 308M. In block 308K, an intermediate CR extracts the client stickiness label from the packet. In block 308L the intermediate CR maps the client stickiness label to a previously set up MPLS label, using a mapping at the intermediate node. Thus, if a stickiness label is found, the CR maps the packet to an egress interface, based on the path setup that was previously carried out and the switching label also carried in the packet, and forwards the packet on that egress interface. The intermediate CR may carry out such mapping based on a first mapping of MPLS path labels and client stickiness values that is maintained at the intermediate CR on a time-to-live basis, and a second mapping that associates MPLS path labels to egress interface values.

In block 308M, the intermediate CR performs a test to determine whether the packet has reached the Last CR. If so, control passes to block 308N, as shown in FIG. 3F. When the packet reaches the Last CR before the server, the Last CR examines the SYN packet for a stickiness label, as in block 308N. If one is found, as indicated by the test of block 308P, the Last CR maps the stickiness label to a specific server, based on its prior SLB decision, on a time-to-live basis, as shown by block 308R. Otherwise, the Last CR generates a new stickiness label, and returns it with a time-to-live value to the client in a SYN ACK packet, as shown by block 308Q.

The foregoing presents one approach to client stickiness; others are presented in Section 4.0 hereof. In the foregoing approach, no latency issue arises, because it would take the same time to send the label distribution information using the SYN packet as any other mechanism, and the SYN packet is a required part of TCP communications. In this approach, each MPLS label is unique to a TCP flow. As a result, all packets of a flow pass through the same content router consistently.

When this approach is used with UDP, modifications may be applied. UDP sessions typically are longer, so dynamic MPLS paths may not be required. If they are, then the first server load-balancing node can send a modified SYN-like packet before sending the real UDP packet. The last server load-balancing device then sends the modified packet to a server.

Since MPLS provides an overlay model and enables a node to stack multiple paths, it can be used in these approaches to derive a virtual path directly between a client and server, whereas the intermediate server load balancing nodes overlay one or more further MPLS path(s). As a result, the virtual MPLS path can be used to support a server-client binding mechanism. A particular kind of label may be used in the MPLS stack to identify a client-server path, and that kind of label is only used for MPLS based transportation as described herein, and not for any MPLS switching. The label could be reinterpreted and adapted differently to provide client-server bindings.

3.2.3 Control Packet Forwarding

An MPLS forwarding agent of a router forwards MPLS-labeled data packets on an interface identified by the MPLS label, regardless of whether the node addressed using that interface is an immediate or distant neighbor. This feature is intended to enable MPLS routers to establish "peer-to-peer" level paths among distant neighbors. MPLS stack frames of labels may be used to discriminate among levels of such paths. But for the MPLS control plane element, this feature becomes troublesome. In particular, the IP header may have an IP address value that is a virtual IP address and represented by many instances of the same IP address at many locations. If the address is an Anycast address, then all nodes have the same 27-bit address. While such nodes may have a unique IP address assigned for reasons of management and internal identification, the MPLS control plane cannot discriminate among such addresses. Therefore, in order for MPLS Control Packets to forward properly from SLB node to node, while passing through non-SLB Layer 3 nodes, hop-by-hop forwarding cannot be used, and different forwarding techniques are necessary.

In order to make sure that intermediate layer nodes pass the control packets to right SLB nodes, the IP header address is modified to reference the selected SLB node. This may be carried out using NAT on each SLB node. If multiple instances of the same address are present, as in the case of Anycast routing, then physically selecting an outgoing interface to a selected SLB Node is workable if all SLB nodes are neighbors and all nodes were complying with Anycast forwarding. However, because there is no control over the behavior of intermediate nodes when forwarding packets with an address that has multiple device instances, NAT on the destination address is necessary.

Alternatively, a previously established MPLS Date Path to SLB neighbors may be used to forward the MPLS Control Plane traffic for SLB without doing NAT. Since an SLB node knows its neighboring SLB nodes, this becomes a scalable solution and a workable alternative to NAT.

3.3 Passing Labels Among Anycast Clouds

In most cases the server selection step of the foregoing processes is expected to result in selecting a nearby server. Therefore, the number of nodes in a path of the type shown in FIG. 1A, FIG. 1B is expected to be between 1 and a small number. In general, the maximum depth is 16, since in the Internet, the furthest server is expected to be no more than 16 hops away. If there is a need to reach servers that are further than 16 hops away, then a tag distribution mechanism can be used to extend the processes herein. The tag distribution mechanism provides a way to pass label values from a node in a first Anycast cloud to nodes in a second Anycast cloud. The Anycast networks may be connected manually or discovered through routing protocols or both, and traffic between them can also be tagged. Since each Anycast cloud can be addressed using a maximum of 16 tag labels, if a node needs to go to another cloud, then the node can use either a tag distribution approach for traffic between clouds.

Alternatively, a nesting approach can be used, in which a label value indicates that a tag is an Intra- or Inter-Anycast Cloud Tag. In this approaches, compact forms of data representation may be used. For example, assuming that are no more than 16 egress paths per Anycast node, each tag may be represented as a 4-bit value. Thus, to store 16 tags, 8 bytes of storage are needed. Accordingly, for supporting the mechanism described herein for both Intra- and Inter-Anycast paths, no more than 16 bytes of storage is needed. In most cases, the Inter-Anycast tags are not needed, and if needed, few are needed. For the same reasons, for Intra-Anycast paths, the number of tags is expected to be small, since a nearby server is expected to be chosen most of the time.

Figure 4:
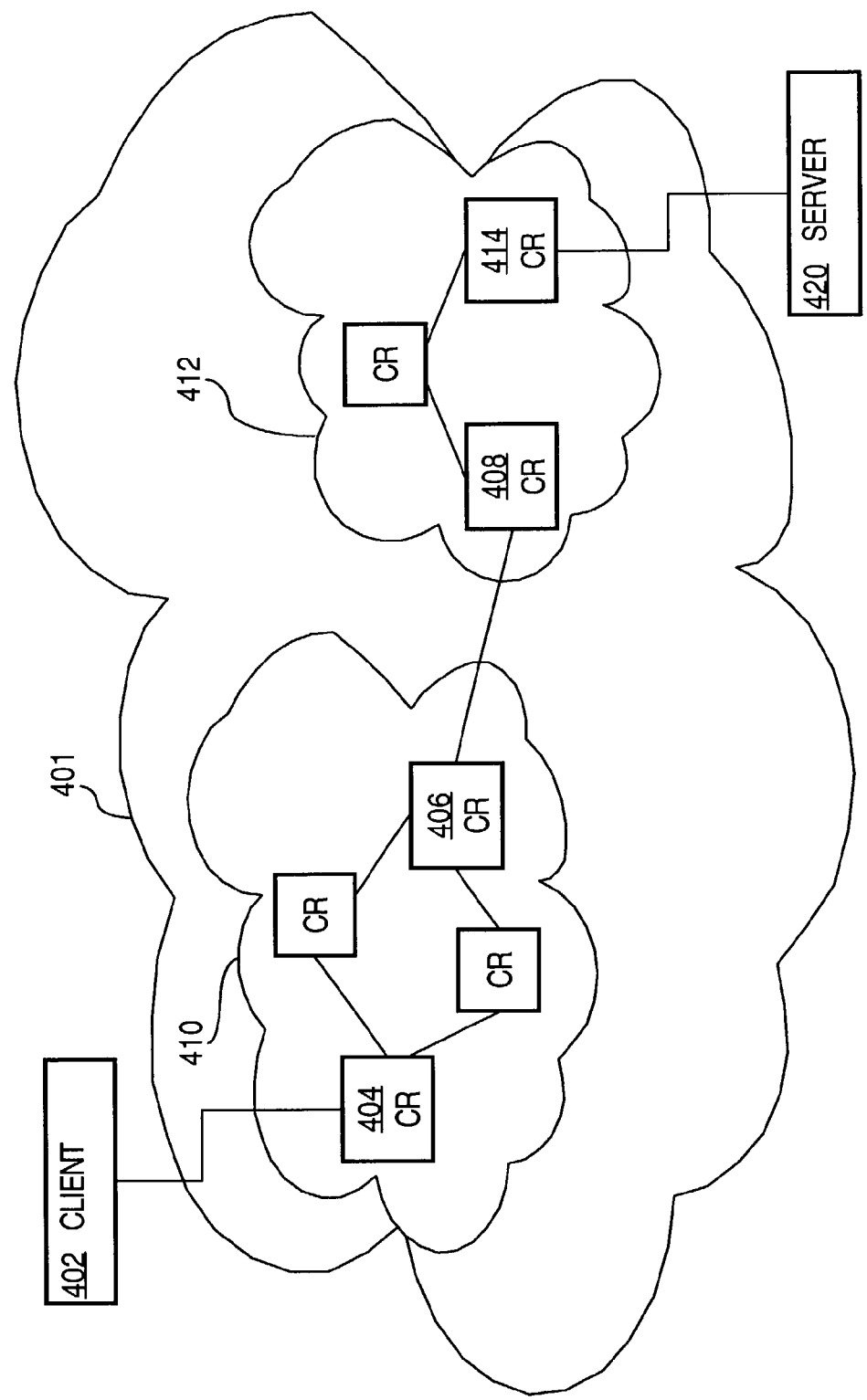
FIG. 4 is a diagram of an internetwork comprising a plurality of Anycast clouds.

FIG. 4 is a diagram of an internetwork comprising a plurality of Anycast clouds. A client 402 is communicatively coupled to a Content Router 404 situated at the edge of a first Anycast network cloud 410 that participates in an internetwork 401 with a second Anycast network cloud 412. Assume that client 402 needs content from server 420. The First CR nearest client 402 is CR 404 in Anycast cloud 410, but the Last CR 414 nearest to server 420 in a different Anycast cloud 412. The foregoing elements are shown to illustrate a simple example, and in a practical network there may be any number of routers participating in any number of Anycast clouds.

In one specific approach, a second-level label stack frame is used to cross BGP or MBGP domain boundaries. Assume that Content Router 404 of FIG. 4 receives a client request packet and carries out a server load balancing decision, which results in selecting server 420, which is outside the BGP/MBGP domain of the Content Router 404, to service the client request. CR 404 selects an egress interface value for a path toward Anycast cloud 412 and places a label identifying the egress interface in a second level stack frame of the packet. A BGP/MBGP router at the edge of Anycast cloud 410, such as CR 406, pushes the pre-assigned label to the best available neighbor cloud, such as Anycast cloud 412, before passing the SYN packet and other packets associated with the client request. The packet arrives at edge content router 408, which is also a BGP/MBGP router. For the label in the packet, router 408 examines return path SYN packets, inspects the second-level label stack frame for an inter-cloud path selection, and inspects the first-level label stack frame to identify an Intra-cloud path selection.

BGP/MBGP router 408 at the edge of the second Anycast cloud 412 then pops the pre-assigned label that was provided by the previous neighbor Anycast cloud 410 before passing the SYN packet and requests onward within Anycast cloud 412. Router 408 uses the first-level label stack frame to determine an egress interface on which to forward the packet. Alternatively, if no label is specified in the first-level stack frame, the router assigns a label and uses it for subsequent packets. For packets in the return direction, the router pushes the pre-assigned label into the packets before forwarding them to the previous neighbor Anycast cloud. In any case, packets arriving at router 408 from client 402 are then forwarded with labels to CR 414 and then to server 420.

By using hierarchical tags in this manner, memory requirements are small and large tables are not required; the overhead of sending tag distribution updates on the order of millions per second are avoided; the trouble of extracting flow information based on label is avoided; and using flow information to extract the ingress or egress tag label for further forwarding is not required.

4.0 Approaches for Providing Client Stickiness

Mechanisms described herein provide client "stickiness" to a server by persistently associating a flow of packets from a server with a particular server in a load-balanced server farm.

Figure 5:
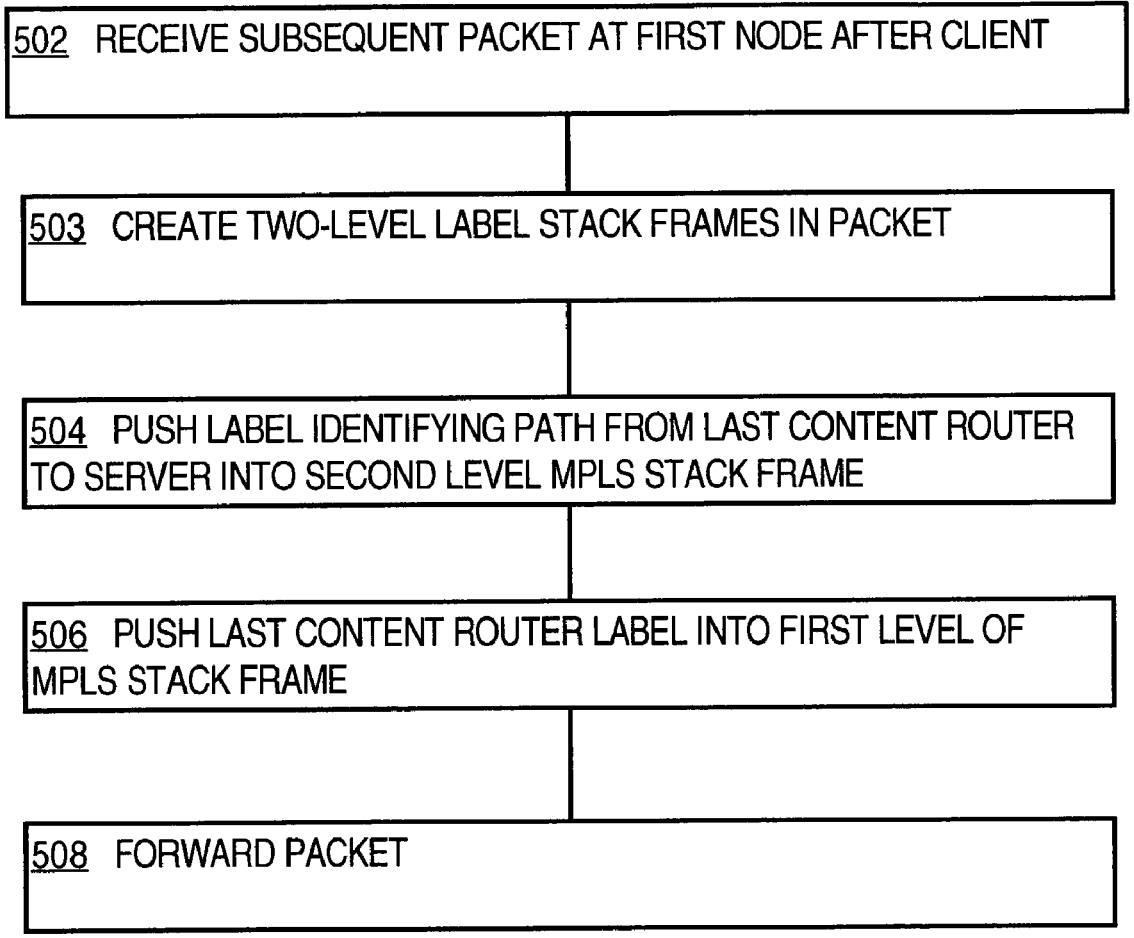
FIG. 5 is a flow diagram of a first approach for providing client stickiness.

FIG. 5 is a flow diagram of a first process for providing client stickiness. The approach of FIG. 5 may be used to provide a client stickiness process as an alternative to block 322 of FIG. 3B. In block 502, a subsequent packet of a flow from a client is received at the first content router node after the client. In block 503, a two-level stack of MPLS labels is created in the packet. In block 504, a label identifying a path from the Last CR to the server is pushed into the lower-most or second level of the MPLS stack. In block 506, the First-CR-to-Last CR label is pushed into the upper-most or first level of the MPLS stack. In block 508, the packet is forwarded, using the egress interface that is identified in the next label in the Return List of ordered labels, using the process described in FIG. 3B.

Thus, in this alternative, the upper-most label in the stack directs the packet to the Last CR for the request. The lower-most label is the L-CR-to-Server label that was returned by the Last CR in block 320 of FIG. 3B. Thus, the lower-most label provides a way to accomplish "client stickiness" by labeling packets with specific transaction information generated by the server, so that each SLB node may use the value in the lower-most label to learn past associations between a client and a server path.

In another alternative, the client may present the first hop SLB node with stickiness information. The first hop SLB node maps the stickiness information received from the client to a label value, and then places the label value in the lower-most label of the stack in the packet. Each first SLB node maintains a mapping of stickiness information to label values on time-to-live basis. All SLB nodes maintain the mapping between the sticky labels and preferred next hop SLB nodes, which could be servers or data centers.

In each of these approaches, the two-level label stacking process described in RFC 2547 may be used. Alternatively, if the transit network does not support MPLS, the upper-most label can be an IP tunneling encapsulation.

The phase of block 308 involves forwarding one or more subsequent content requests relating to the same client and server. Thus, block 308 represents an instance when a First CR may receive a Content Request that needs to be "sticky" with respect to a previous request; that is, it needs to be processed by the same Content Server as the previous request. To provide client-server "stickiness," the First CR may maintain a longer, persistent mapping between a cookie or client IP address and a Stickiness Identifier. In this approach, the Stickiness Identifier is the same as the Last CR to Server Label, and reuses the MPLS path that was previously set up. As a result, requests are directly sent from the First CR to the Last CR. If the MPLS path is torn down for any reason, then the requests still may be sent directly from the First CR to the Last CR.

In the approaches herein the labels for forward paths may be used to ensure that subsequent packets go to the same server. As a result, client-server stickiness is provided without requiring TCP termination or cookies.

FIG. 6A, FIG. 6B, FIG. 6C, and FIG. 6D are flow diagrams of an alternative approach to providing client stickiness and server stickiness. In this approach, the capability of server load balancing devices to rewrite Layer 3 and Layer 2 packet data values is leveraged. In general, the MPLS label mechanism as described herein is used, but the last tag label in each ordered list (e.g., the Send List or Return List) persistently and uniquely identifies either the client or server, depending on the direction of the traffic.

In one specific embodiment, it is assumed that the first node or last node needs to use network address translation to properly address the packet to the client or server, respectively, and the last tag label is an index into a table that is used by the first node or last node to rewrite the Layer 2 or Layer 3 destination address values in the packet. Alternatively, the table maps the last tag label to an egress interface or an ingress interface of the first node or last node. In yet another alternative, the a priori labeled path from First-CR to Last-CR is used.

The process of FIG. 6A may be carried out as part of block 307 or 308 of FIG. 3A, i.e., as processing at a First CR after a Return List has been developed through processing of first packets of a client request and a server reply. In block 604, in response to receiving a first packet of a client request, a First CR inserts a unique client identifier value in the EP packet header. In block 606, the First CR stores a record associating a flow identifier with the client ID value and either the Return List or the F-CR-to-L-CR label that was discovered using discovery packets.

FIG. 6B illustrates a similar process appropriate to carry out at a Last CR at the server end. In block 612, the Last CR inserts a unique server identifier value in the IP packet header of a packet in a server reply flow. In block 614, the Last CR stores a record associating a flow identifier of the reply flow with the server identifier and the Send List.

Figure 6C:
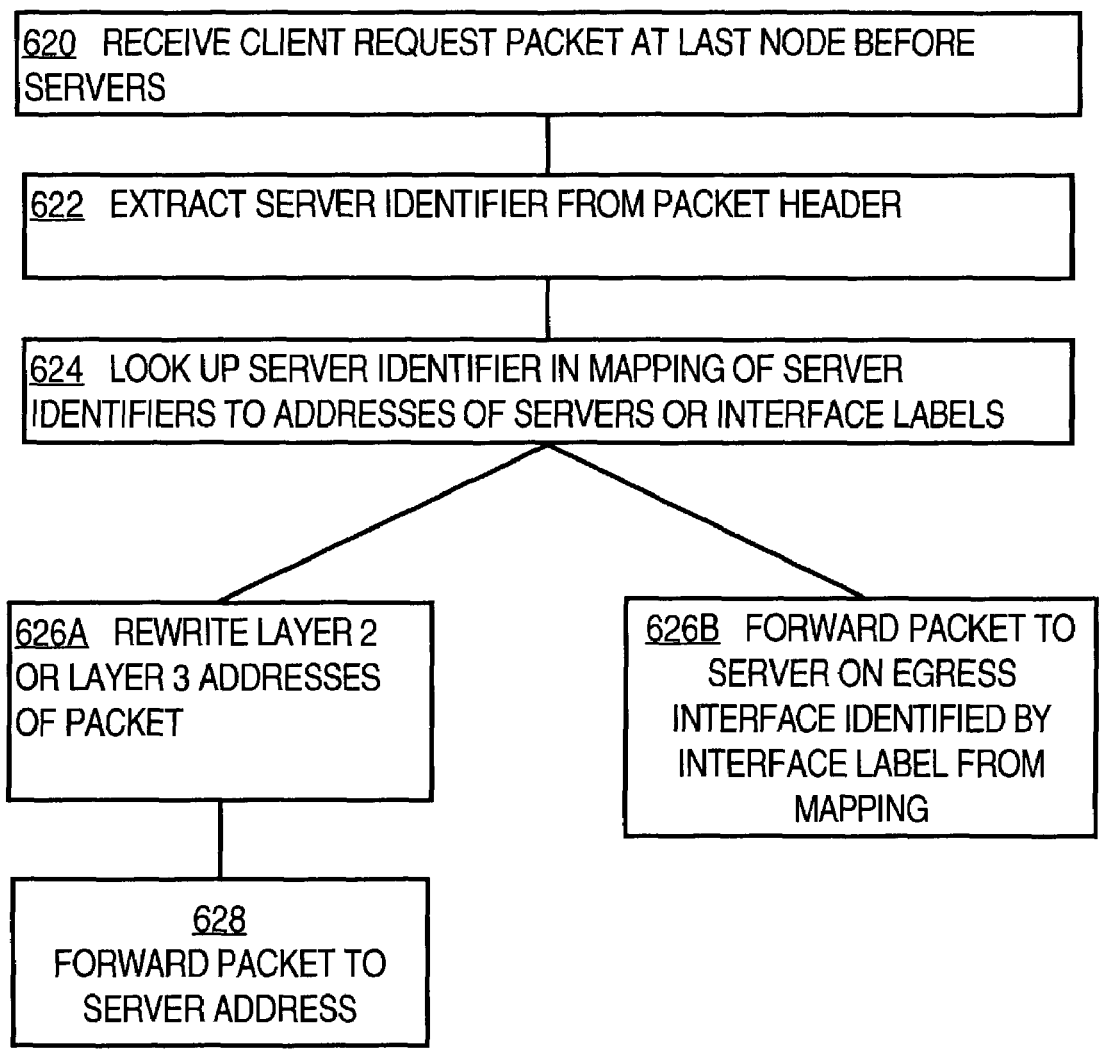
FIG. 6C is a flow diagram of additional steps in an approach for providing client stickiness

FIG. 6C illustrates a process of directing a packet to a load-balanced server when the processes of FIG. 6A and FIG. 6B have been used. In block 620, a client request packet is received at the last node before the server, i.e., at a Last CR. In block 622, the server identifier value is extracted from the IP packet header. In block 624, the server identifier value is looked up in a mapping, kept at the Last CR, which associates server identifiers with addresses of servers or interface labels.

If network address translation is in use at the Last CR, then control is passed to block 626A, in which the Last CR rewrites the Layer 3 address to the packet so that the destination address values reference the selected server that is identified by the server identifier. In block 628, the packet is forwarded to that server. Alternatively, if NAT is not used, then in block 626B the packet is forwarded on an egress interface that is identified by an interface label that is obtained from the mapping at the Last CR. In another alternative, the LSP path with the F-CR-to-L-CR label found through discovery is used.

Figure 6D:
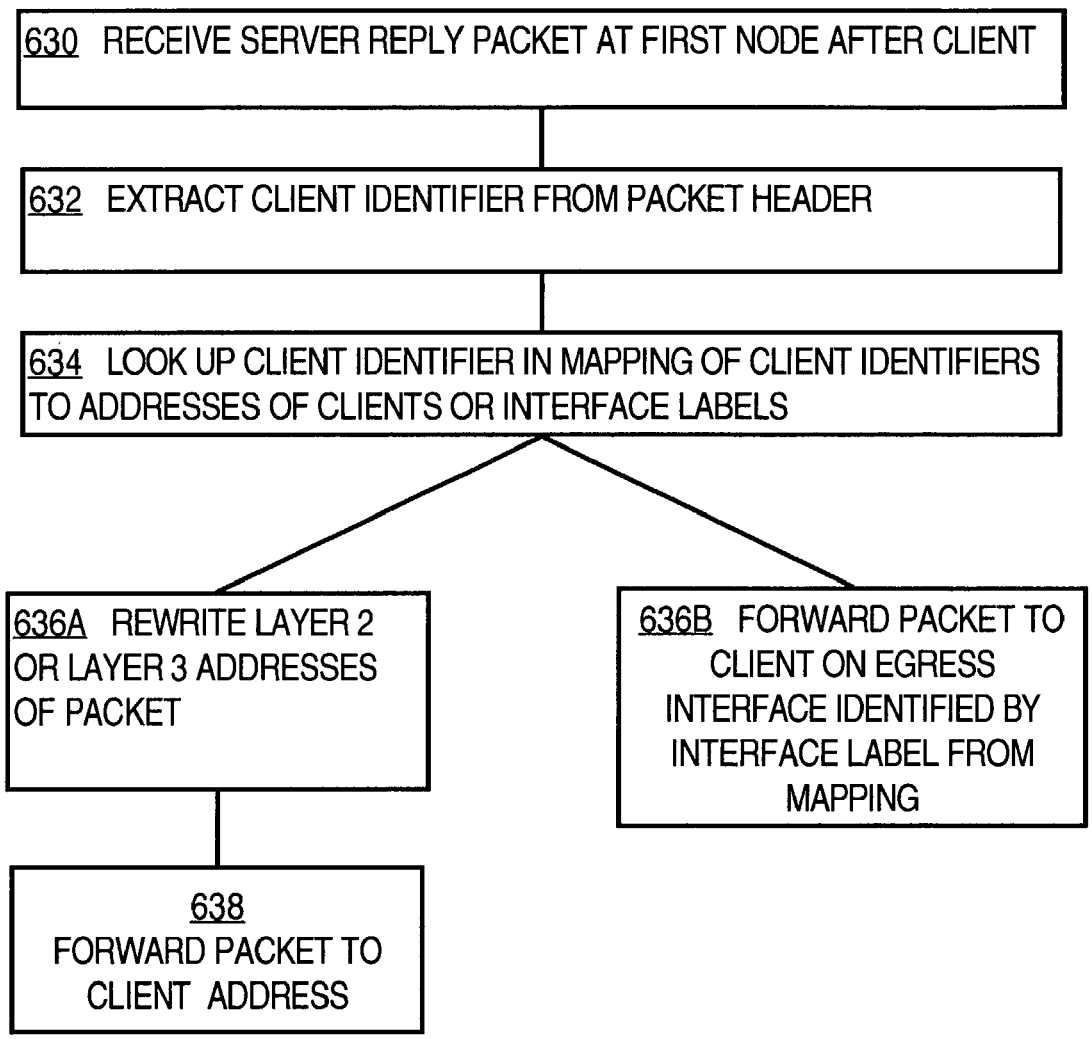
FIG. 6D is a flow diagram of additional steps in an approach for providing client stickiness.

FIG. 6D illustrates a process of directing a packet from a load-balanced server to a client when the processes of FIG. 6A and FIG. 6B have been used. In block 630, a server reply packet is received at the first node after the client, i.e., at a First CR. In block 632, the client identifier value is extracted from the IP packet header. In block 634, the client identifier value is looked up in a mapping, kept at the First CR, which associates client identifiers with addresses of clients or interface labels.

If network address translation is in use at the First CR, then control is passed to block 636A, in which the First CR rewrites the Layer 2 or Layer 3 addresses to the packet so that the destination address values reference the client that is identified by the client identifier. In block 628, the packet is forwarded to that client. Alternatively, if NAT is not used, then in block 636B the packet is forwarded on an egress interface that is identified by an interface label that is obtained from the mapping at the First CR.

At the last node, network address translation may be unnecessary in this approach if the last node has identical virtual IP addresses configured for the endpoint servers. For the first node, NAT generally is unnecessary unless there is a requirement to hide client addresses from the outside. Therefore, carrying a last tag label that identifies a client is optional. Further, a mapping of the last tag label to the server can be avoided for Layer 3 if the servers carry out NAT themselves.

The memory requirements of the mapping table for this approach are minimal compared to storing a table of 5-tuple mappings. Further, use of the table eliminates the need to terminate TCP to accomplish client stickiness.

The tag label lists may also carry a SLB group key or other unique identifier to identify which SLB group is addressed. Normally one SLB group is defined for a hierarchy of SLB nodes.

In one embodiment of this approach, each client and server is assumed to know a tag label for its nearest neighbor SLB node that is associated with a server or client (the "Ns-Id" and "Nc-Id" Tag Labels, respectively). An intermediate SLB device stores tag labels ("Nn-Ingress and Nn-Egress Tag Labels") that identify ingress and egress ports or interfaces for its nearest neighbors. As described above, each client stores an ordered list of egress interface Tag Labels that represent a path to a last hop SLB node, and an Nn-Egress and Ns-Id. The latter value serves as an index into a table of server Layer 2 and Layer 3 data, if NAT is being used. The ordered list of labels is used also to fast switch the second request packet to the last request packet of a flow. Alternatively, the F-CR-to-L-CR label found through discovery is used for such fast switching. The Tag Labels also may be used to index into the table to find the next hop Layer 2 address and/or Layer 3 address if NAT is used.

Each server stores an ordered list of such values, e.g., {Nn-Ingress, . . . , N2-Ingress, NI-Ingress, Nc-Id}. The latter value is used for indexing to find the next client address at Layer 2 or Layer 3, if NAT is used. The ordered list of labels is used also to fast switch the subsequent flows, second reply packets to the last request packet onwards. The Tag Labels also may be used to index into the table to find the next hop Layer 2 address or Layer 3 address if NAT is used.

As an optimization, the forward and reverse paths are assumed to be identical but opposite in flow direction. Therefore, control processing to develop an ordered list of path labels is carried out only in the forward direction, rather than in both directions. The ordered list developed in the forward direction is used, in inverse order, to fast switch packets in a path in the reverse direction.

Using this approach, a last-hop SLB can evaluate the Tag Labels stored by the client, and can then direct or map the client to the right server, or the same server previously used, to thereby provide "client stickiness" or "server affinity." The client label values stored by the last-hop SLB can be hashed at the last-hop SLB to conserve space and to uniquely identify a client. In one embodiment, the MD5 one-way hash algorithm is used to generate hash values. The Ns-Server and Ns-Client values can be created by generating an MD5 hash value based on a unique seed value, e.g., a number that is generated based on the then-current time and the MAC address of the node that is generating the values.

The last hop SLB node then stores a mapping table that associates the unique client identifier to a server identifier. When a client request packet arrives, the last hop SLB extracts the client identifier value from the lower-most label stack location, looks up the corresponding server in the mapping, and forwards the packet to the specified server. While this approach requires the last SLB node to store a limited amount of state information for purposes of supporting client stickiness, overall memory savings still results, and only approximately 8 or 16 bytes are required for each server identifier per flow. In contrast, prior approaches required storing state values of around 2×104 bytes per TCP/UDP flow.

In one embodiment, the TCP protocol is modified to provide storage of such mappings in a specified portion of the TCP stack or TCP agent in each client and server machine that supports TCP.

Using the foregoing approach, client stickiness or server affinity is provided without TCP termination. The disclosed approaches can be used for HTTP, other TCP/UDP-based protocols, VoIP based applications such as Help Desk applications, etc. URL load balancing may be performed. The approaches may also be used for broadband content distribution.

5.0 Scaling Server Load-Balancing Routers that Do TCP Termination

Figure 7A:
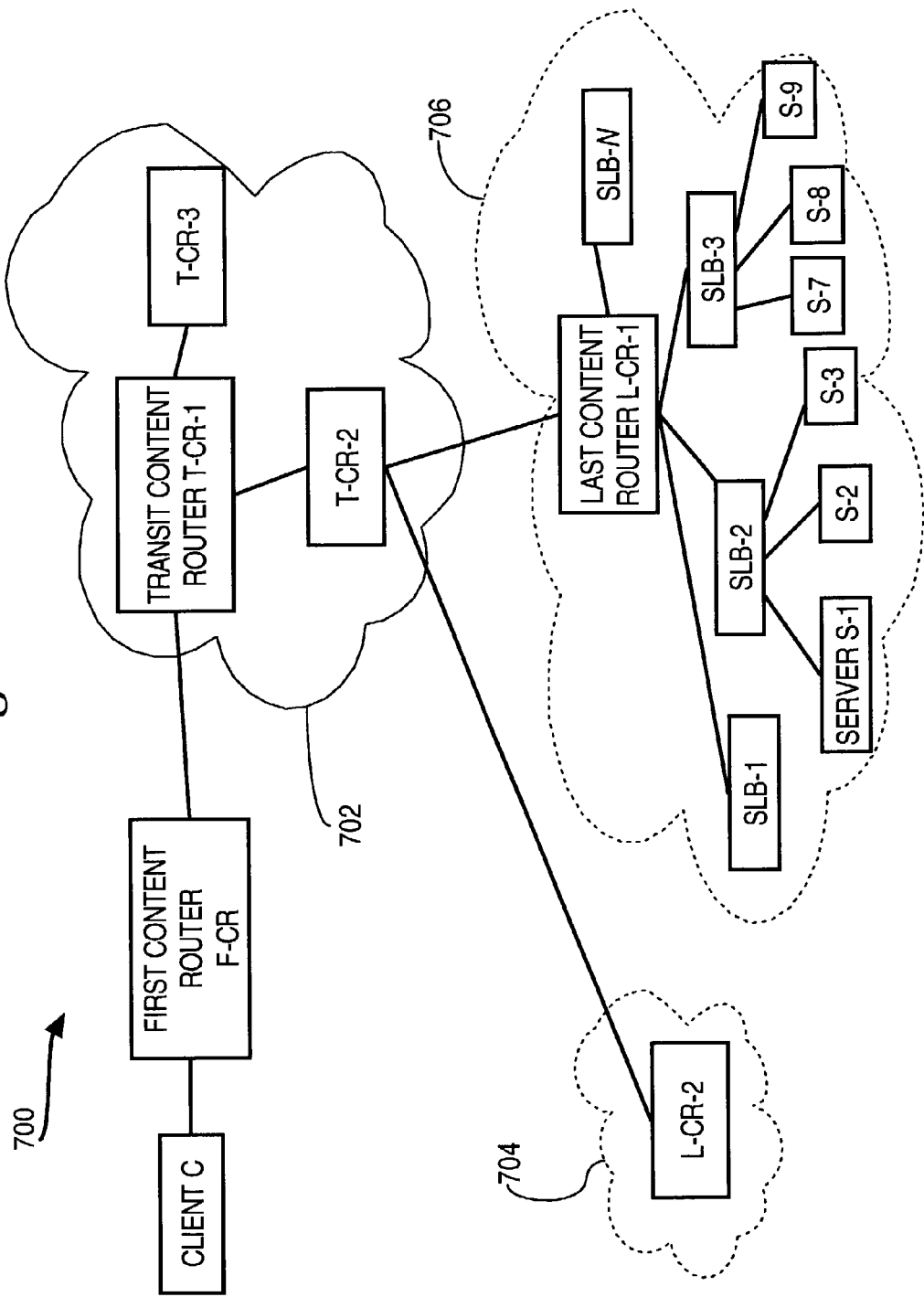
FIG. 7A is a block diagram of an example network that is provided for use in illustrating a process of scaling server load-balancing routers.

FIG. 7A is a block diagram of an example network that is provided for use in illustrating a process of scaling server load-balancing routers. A network 700 includes a Client C that is communicatively coupled to a first content router F-CR. The term "first" is used to signify that F-CR is the first content routing device that is encountered by a flow of packets directed from Client C to a server elsewhere in the network; however, this term is used purely for convenience to indicate a logical position relative to other network elements, and its use is not required in an embodiment.

The F-CR is communicatively coupled, directly or indirectly through one or more transit content routers T-CR-1, T-CR-2 in an internetwork 702, to a last content router L-CR-1. The term "last" is used to signify that the L-CR is the last content routing device that is encountered by a flow of packets directed from Client C to a server, and just before the packets arrive at a TCP terminating server load balancing device in the network; however, this term is used purely for convenience to indicate a logical position relative to other network elements, and its use is not required in an embodiment. The L-CR is coupled to a plurality of server load balancing devices ("SLB devices") SLB-1, SLB-2, SLB-3 that are organized in a first server farm 704. The server load balancing devices SLB-1, SLB-2, SLB-3 may be conventional SLB devices; embodiments of the invention provide ways to scale up their operations. The network may comprise many such sites 704, 706, each having its own L-CR, associated server load balancing devices, and servers.

Each of the SLB devices SLB-1, SLB-2, SLB-3 are communicatively coupled to one or more servers that they load balance. For example, SLB-1 is responsible for load-balancing requests with respect to servers S2, S3. SLB-3 controls requests directed to servers S7, S8, S9.

For purposes of illustrating a clear example, only one Client C, and F-CR, and only two sites 704, 706 with L-CRs are shown in FIG. 7A; however, in a practical embodiment, there may be any number of such elements in network 700.

Figure 7B:
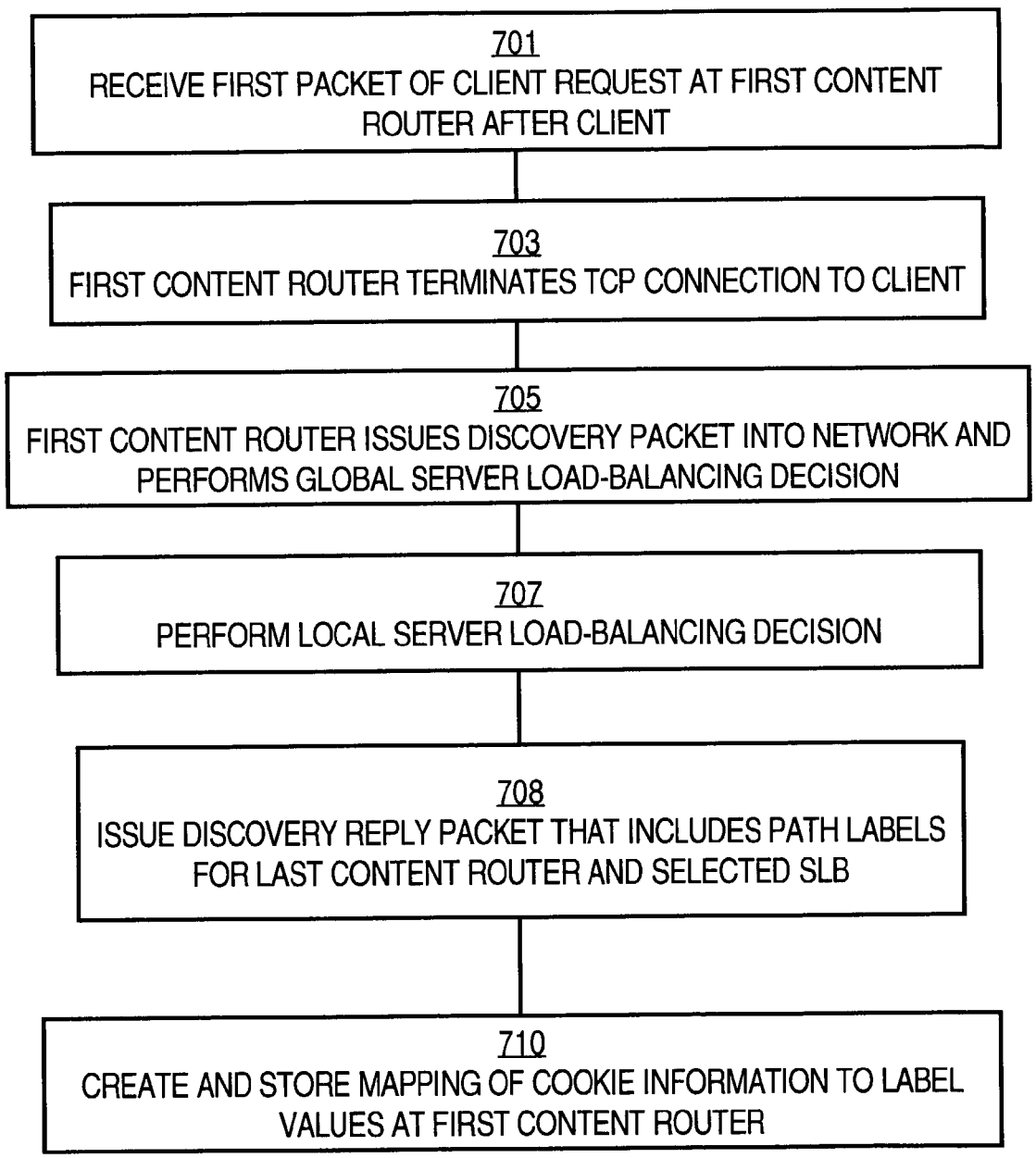
FIG. 7B is a flow diagram of a process of scaling server load-balancing routers.
Figure 7C:
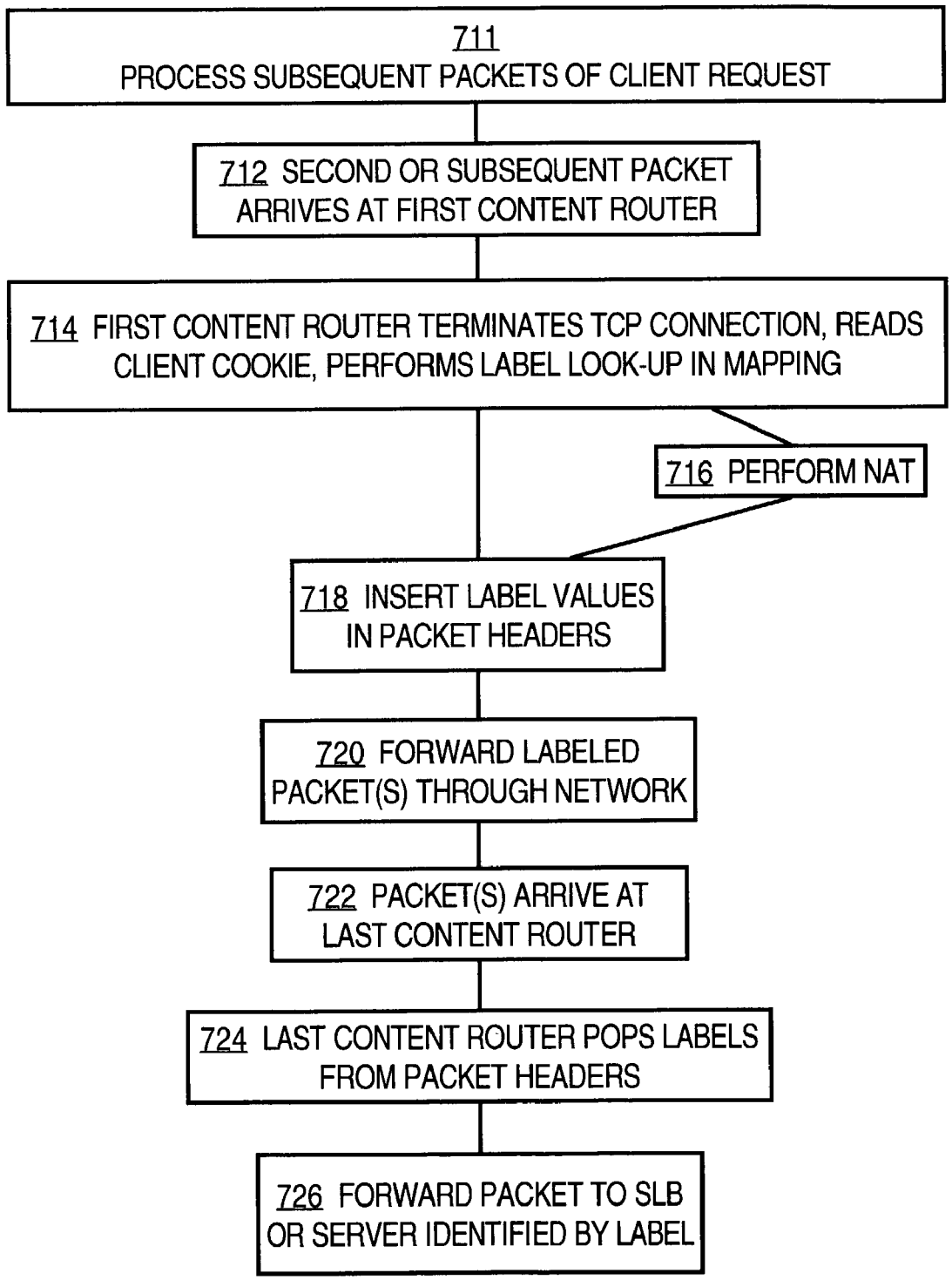
FIG. 7C is a flow diagram of a process of scaling server load-balancing routers and FIG. 8 is a block diagram that illustrates a computer system upon which an embodiment may be implemented.

FIG. 7B and FIG. 7C are flow diagrams of a process of scaling server load-balancing routers. For purposes of illustrating a clear example, the process of FIGS. 7B-7C is described with reference to the example network of FIG. 7A. However, embodiments are not limited to the context of FIG. 7A, and are applicable to any network that includes a client, content routers, server load-balancing devices, and servers. Further, while embodiment are described in the context of TCP/IP networks, embodiments are not limited to such a context, and are applicable to any other network that includes a client, content routers, server load-balancing devices, and servers.

Referring first to FIG. 7B, steps involved in processing a first or initial packet of a client request are shown. In block 701, a first packet of a request from client C is received at F-CR over TCP. In block 703, the F-CR, rather than an SLB device as in past approaches, terminates the TCP connection. Such termination creates the appearance to client C that it is communicating with a server in the position of the F-CR, provides a scalable solution, and provides backward compatibility. Specifically, the TCP termination occurs closer to the source of a request, Client C, rather than at one of the SLB devices, which must process a far higher volume of requests because they are closer to the content that is sought in the requests.

In block 705, F-CR issues a discovery packet into the network that contains the T-CRs, L-CR, and possibly other network elements. The purpose of issuing a discovery packet is to determine which global site holds the content needed to respond to the request of Client C, and thus to select one L-CR from among many L-CRs and sites that may be in the network. For example, sites 704, 706 are considered and one site is selected. Accordingly, the discovery packet is subjected to one or more global server load-balancing decisions and arrives at L-CR. Thus, as part of block 705, the F-CR performs a Layer 7 global server load-balancing decision and decides which server site will receive packets associated with the client request. Referring to FIG. 7A, the F-CR determines which site, among sites 704, 706, etc., will receive the packets. The T-CRs may assist in the decision, thereby providing further scalability for the system.

The information communicated from L-CR to F-CR may be conveyed using two mechanisms. In one alternative, the information is carried hop-by-hop between the T-CRs. This approach is workable where all packets can traverse the same path in both directions in the core of the network, where intermediate routers such as T-CR-1, T-CR-2 can maintain load balancing state information, and where operation of TCP in the core of the network can be modified. In this approach, the T-CR's maintain state information. In a second approach, the information is sent directly from the L-CR to the F-CR, including information such as an IP address that allows subsequent packets to go directly from the F-CR to the L-CR, without passing through the T-CRs. This approach is considered better and more scalable.

In either approach, the information can be "piggybacked" on a return SYN packet, or carried in a discovery reply packet, which might also carry the return SYN packet. The SYN packets are exchanged as part of TCP handshaking and data exchange. For example, in the second approach, in response to an initial SYN packet, the Last CR will reply back to the First CR with state values that are "piggybacked" on SYN packets. The state values may include the IP address of the Last CR, or a server IP address. Subsequent flows may then proceed directly from the Last CR to the First CR without involvement of the T-CRs, which are not required to maintain state information.

In block 707, a local server load balancing decision is performed. Each L-CR can select one SLB device, from among a plurality of SLB devices in its site, to receive the client request. Thus, block 707 involves selecting one of the SLB devices. In part, this enables scaling a single SLB device to multiple devices.

In block 708, the L-CR sends a discovery reply packet back to the F-CR. A destination address field in the discovery reply packet identifies the L-CR, and may comprise a unicast address of the L-CR. Further, the discovery reply packet contains a label value that identifies a path in the network from the F-CR to the L-CR. The discovery reply packet also may include a label that identifies a particular SLB device, or an address of a server, which has been selected by the L-CR to process the client request, in the form of a label specifying a path from the F-CR to the selected SLB device. The labels may be MPLS labels that are passed on an MPLS data plane over IP among the network elements.

In block 710, when the discovery reply packet arrives back at the F-CR, in response the F-CR creates and stores an entry in a table that maps client cookie information to label values that identify paths from the F-CR to the L-CR, and to label values that identify paths from the F-CR to the selected SLB device. The client cookies contain an IP address of the SLB device, or a selected server S1, S2, etc.

Cookies may be created or introduced using several approaches. In one approach, a client cookie is created when a first packet of a client request arrives at a server that has been selected from among S2, S3, S9, etc. The selected server creates the cookie, places its own IP address in the cookie, and returns it to the client, which stores the cookie persistently at the client. Thereafter, when the client sends another request to the F-CR, and the request is received within a specified time, the IP address in the client cookie may be used to route the client request, thereby bypassing the global load-balancing decision that would typically be required. Client cookies are referenced in the mapping specified in block 710 in order to maintain backward compatibility with existing approaches.

Alternatively, if the server fails to create a cookie, or fails to create a cookie containing its IP address, then an SLB device can insert a cookie into the packet flow. For example, if a request from Client C reached server S2 through SLB-1, but S2 failed to create a cookie, then SLB-1 would create and insert a cookie into the packet flow so that it is returned to Client C. S2 might fail to create a cookie containing its IP address because S2 uses cookies for other purposes, such as supporting session persistency in e-commerce transactions. Further, S2 might fail to create a cookie because for policy reasons, for example.

Referring now to FIG. 7C, subsequent packets of the client request are processed using the steps starting at block 711.

In block 712, a second or subsequent packet of a request from Client C arrives at F-CR. In block 714, the F-CR terminates the TCP connection and reads the cookie at Client C. By reading the cookie, the F-CR retrieves an identifier referencing the selected server. The F-CR looks up information found in the cookie in the mapping at the F-CR, and obtains a label identifying a path in the network from F-CR to L-CR as well as a label identifying a path from F-CR to a particular SLB device, such as SLB-1.

At this point in the process, the F-CR may proceed according to two alternative approaches. In a first approach, as indicated by optional block 716, the F-CR may perform network address translation, to yield a destination address of a selected SLB device or server. Using this approach, the F-CR may forward the subsequent packets directly to the selected SLB device or server.

Further, the L-CR also may place, in the discovery reply packet that is sent in block 708, a mapping between the virtual server address and the address of the SLB device or a selected server. If this is done, then in block 710, the F-CR may perform network address translation on the destination address of the second or subsequent packets, in order to yield a real destination address of the selected SLB device. The L-CR instructs the F-CR to perform NAT if the F-CR previously has informed the L-CR that the F-CR is capable of performing NAT.

Alternatively, in block 718, the F-CR inserts two label values from the mapping into the client request, in the form of labels or tags that are placed in the discovery reply packet, which could be piggybacked on the Layer SYN packets, and forwards the request into the network. The L-CR and F-CR are configured to understand the modified SYN packets and the labels or tags. The first or upper label identifies a path from the F-CR to the L-CR, and the second label identifies a path from the F-CR to a selected SLB device. Two-level stack frames, as described above in connection with other embodiments, may be used. This alternative is appropriate only when packets are label-switched on intermediate hops; if not, then a single SLB label may be used, and such packets may be communicated directly from F-CR to L-CR by encapsulating them in IP. In block 720, intermediate network elements such as T-CR-1, T-CR-2, etc., forward the request through the network, label-switching techniques, until the request arrives at the L-CR. The network elements may use MPLS, for example, as a label-switching technique. The network elements perform label switching by popping the label (identifying a path from F-CR to L-CR) from the packet header, looking up the label value in a mapping that specifies an egress interface and a new label value, inserting the new label value in the packet header, and forwarding the packet on the egress interface. This process is repeated, at all intermediate network nodes, until the L-CR is reached.

In block 722, the packets arrive at the L-CR. In response, in block 724, the L-CR pops and reads the SLB label (identifying a path from F-CR to either an SLB device or server).

In block 726, the L-CR forwards the packet(s) either to an SLB device or a server, based on the SLB label. For example, if the SLB label identifies a path to an SLB device, then the L-CR may look up the SLB label in a mapping, stored at the L-CR, that associates such SLB path labels to IP addresses of specific servers that are load-balanced by the SLB device associated with the label. In this way, the L-CR obtains a destination address directly to a selected server. Alternatively, the L-CR may look up the label in a mapping of labels to IP addresses of SLB devices, and then forward packets in the flow to that IP address. In that alternative, the SLB device is responsible for forwarding the packets to a particular server. In still another alternative, the L-CR may do no modification of the address if the F-CR already had performed NAT, as previously agreed upon by the L-CR and F-CR.

In either alternative, the F-CR or L-CR may perform network address translation. Thus, if the servers associated with an SLB device use virtual addresses, then the F-CR or L-CR may perform network address translation to determine a specific destination address for the referenced server. Thus, optionally, as part of block 726, the F-CR may perform network address translation on the label, in order to determine a real destination address of the SLB device. In this alternative, the label is omitted, and an address of the SLB device is specifically identified in the destination address field of the packets.

It is assumed, in implementing approaches that use upper labels for switching the packet along the path between T-CRs, that the network 700 provides an out-of-band protocol or mechanism for distributing label values, and corresponding ingress interface and egress interface values that should be used to label-switch the labels. As examples, labels for paths are distributed using Tag Distribution Protocol (TDP), Label Distribution Protocol (LDP), or MPLS extensions to BGP or OSPF.

Alternatively, distribution of such upper labels may occur by attaching the upper labels to modified SYN packets that are exchanged by routing devices as a part of establishing TCP connections. For example, in a network that does not contain a core having T-CR-1, T-CR-2, or other intermediate devices, then one or more paths may be set up, using a label distribution protocol, directly from the F-CR to one or more L-CR devices. In this approach, a label identifying a selected L-CR device may be placed in SYN packets that are directed from the F-CR to the selected L-CR device, and a label identifying the F-CR may be placed in a SYN acknowledgment packet that is directed from the L-CR to the F-CR. Thus, a label distribution mechanism may be integrated with or "piggybacked" on the SYN packet communication mechanism that is natively supported under TCP. However, this approach requires modification of TCP processing routines to detect, extract, and process the labels.

In still another alternative, label distribution is performed by attaching the labels to discovery packets that are dispatched to the network elements using Content Discovery Protocol (CDP) or similar network device discovery protocols.

The approaches described herein provide backward compatibility with respect to existing data centers that comprise SLB devices and servers. In particular, the approaches described herein do not require any modification to existing SLB devices and servers, since all functions required to implement the approaches are performed at routers such as the F-CR and L-CR. Thus, the approaches herein may be deployed merely by making a software update to those routers that are serving as F-CR and L-CR.

Using these approaches, the L-CR can selectively route packet flows to one or more SLB devices, which perform further server load balancing decisions with respect to sets of servers, while maintaining client stickiness information or Layer 7 URL load balancing information in the packet flows.

Thus, an approach providing highly scalable server load balancing at the local load balancing level is provided, in a way that is compatible with and complementary to existing global server load balancing technologies. The approach also can be implemented without modification of the client or server; appropriately programmed routers in the position of the F-CR and L-CR provide all necessary functionality. Further, the TCP processing functionality of such routers may be modified to accommodate SYN packet piggybacking, as described above.

6.0 Hardware Overview

Figure 8:
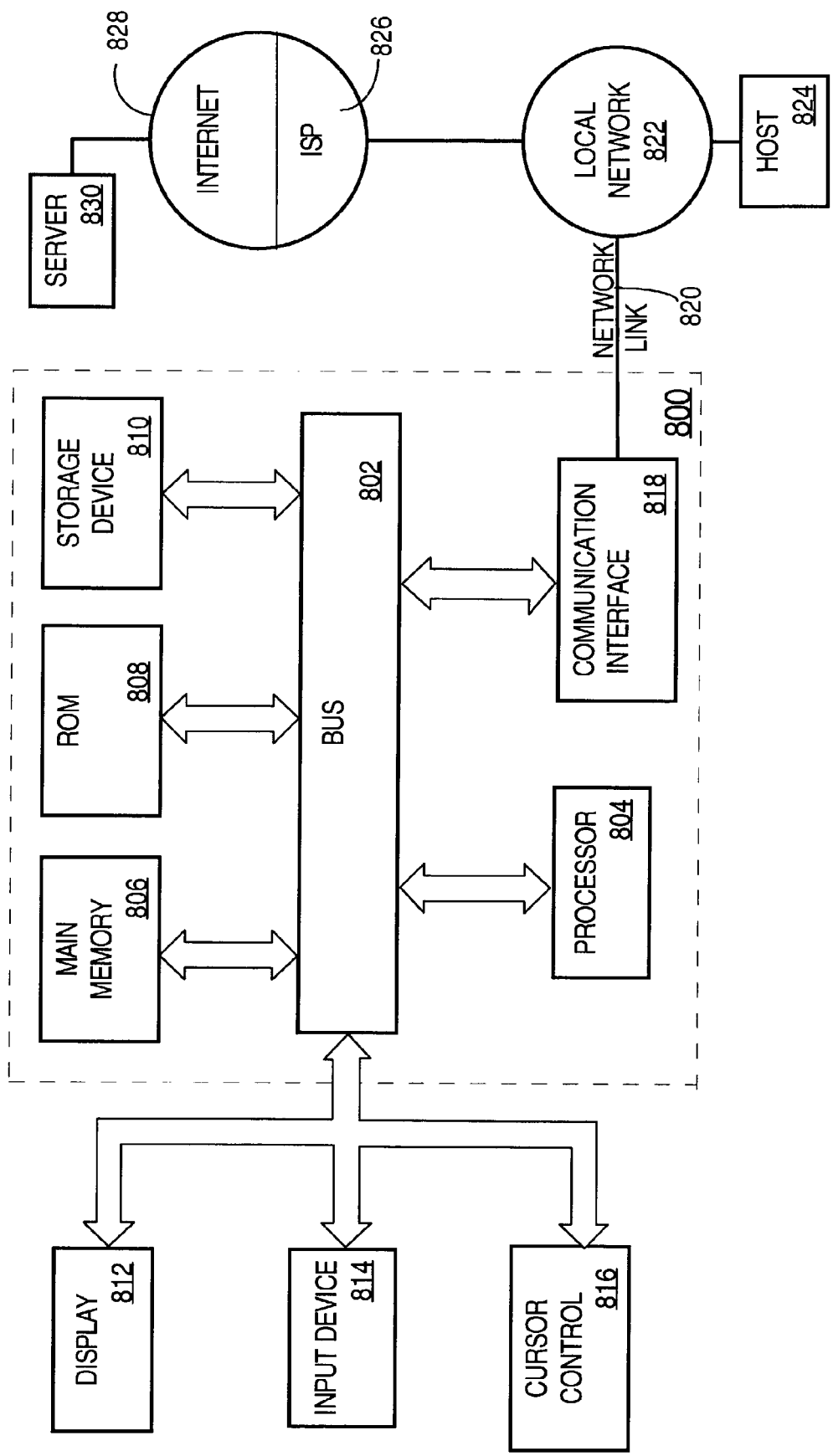

FIG. 8 is a block diagram that illustrates a computer system 800 upon which an embodiment of the invention may be implemented.

Computer system 800 includes a bus 802 or other communication mechanism for communicating information, and a processor 804 coupled with bus 802 for processing information. Computer system 800 also includes a main memory 806, such as a random access memory ("RAM") or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory ("ROM") 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube ("CRT"), for displaying information to a computer user. An input device 814, including alphanumeric and other keys, is coupled to bus 802 for communicating information and command selections to processor 804. Another type of user input device is cursor control 816, such as a mouse, trackball, stylus, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for providing highly scalable server load balancing. According to one embodiment of the invention, providing highly scalable server load balancing is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network ("ISDN") card or a modem to provide a data communication connection to a corresponding type of telephone line. As another example, communication interface 818 may be a local area network ("LAN") card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider ("ISP") 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides highly scalable server load balancing as described herein.

The received code may be executed by processor 804 as it is received, and/or stored in storage device 810, or other non-volatile storage for later execution. In this manner, computer system 800 may obtain application code in the form of a carrier wave.

Embodiments may be implemented using a Cisco server load-balancing product with modified software as the First CR in the network of FIG. 1A. Further, the approaches herein may be used to improve scalability of existing server load balancing devices.

7.0 Extensions and Alternatives

In the foregoing specification, the invention has been described with reference to specific embodiments thereof. Advantages accrue from certain embodiments in that the disclosed approaches do not use tag or label distribution protocol when using dynamic MPLS Paths per TCP/UDP connection. Further, network nodes do not need to track flows by keeping flow to tag label mappings for either their ingress or egress interfaces; instead, packets carry path labels that intrinsically indicate where the packet is routed next. Also, the disclosed approaches avoid the need for lookups from ingress tag to flow 5-tuples and from flow 5-tuples to egress tag. It will be evident that various modifications and changes may be made to embodiments herein without departing from the broader spirit and scope of the invention. The specification and drawings are, accordingly, to be regarded in an illustrative rather than a restrictive sense.

What is claimed is:

1. A method of providing highly scalable network server load balancing, the method comprising the steps of: receiving, at a first router in a path from a client to one or more server sites, a packet of a request from a client; selecting a particular server site to process the client request; determining a first path from the first router through a network to a second router associated with the particular server site, and a second path from the first router to a server load-balancing device associated with the second router; creating and storing a mapping of flow identifying information, associated with the packet, to a first multi-protocol label switching (MPLS) label value that identifies the first path and to a second MPLS label value that identifies the second path; storing the first MPLS label value and the second MPLS label value in the packet; distributing the first and second MPLS label values to the network by attaching the first and second MPLS label values to a discovery request packet that is sent into the network by the first router; forwarding all subsequent packets associated with the client request to the server load-balancing device based on looking up the first MPLS label value and second MPLS label value in the mapping, wherein the server load-balancing device does not terminate any TCP connections; receiving a cookie containing server address information from the second router, wherein the server address information identifies a server that is managed by the load-balancing device; and storing the server address information in the mapping of flow identifying information.

2. A method as recited in claim 1, further comprising the steps of performing a global server load-balancing decision to result in selecting a particular server site to process the client request.

3. A method as recited in claim 1, wherein the receiving step further comprises terminating a TCP connection of the client at the first router.

4. A method as recited in claim 1, wherein the determining step further comprises performing a local server load-balancing decision to select the load-balancing device from among a plurality of load-balancing devices that are associated with the second router.

5. A method as recited in claim 1, further comprising the steps of:
selecting a particular server load balancing device that is associated with the second router of the particular server site from among a plurality of server load balancing devices in the particular server site;
storing, in the mapping of flow identifying information, the second MPLS label value that identifies a path from the first router to the selected server load balancing device.

6. A method as recited in claim 1, further comprising the steps of:
receiving a cookie containing server address information from the second router;
storing the server address information in the mapping of flow identifying information.

7. A method as recited in claim 1, further comprising the steps of performing network address translation to result in determining a network address of a server that is managed by the load-balancing device.

8. A method as recited in claim 1, wherein the forwarding step further comprises the steps of:
receiving one or more subsequent packets associated with the client request at the second router;
extracting the first MPLS label value and second MPLS label value from the packets;
forwarding the packets to the server load-balancing device based on the first MPLS label value and second MPLS label value.

9. A method as recited in claim 1, further comprising the steps of:
receiving a subsequent client request packet at the second router;
extracting a server identifier value from an IP header of the subsequent client request packet;
looking up the server identifier value in the mapping; and forwarding the subsequent client request packet on an egress interface that is determined based on a MPLS label in the mapping corresponding to the server identifier value.

10. A computer-readable storage medium storing one or more sequences of instructions for providing highly scalable network server load balancing, which instructions, when executed by one or more processors, cause the one or more processors to carry out the steps of: receiving, at a first router in a path from a client to one or more server sites, a packet of a request from a client; selecting a particular server site to process the client request; determining a first path from the first router through a network to a second router associated with the particular server site, and a second path from the client to a server load-balancing device associated with the second router; creating and storing a mapping of flow identifying information, associated with the packet, to a first multi-protocol label switching (MPLS) label value that identifies the first path and to a second MPLS label value that identifies the second path; storing the first MPLS label value and the second MPLS label value in the packet; distributing the first and second MPLS label values to the network by attaching the first and second MPLS label values to a discovery request packet that is sent into the network by the first router; forwarding all subsequent packets associated with the client request to the server load-balancing device based on looking up the first MPLS label value and second MPLS label value in the mapping, wherein the server load-balancing device does not terminate any TCP connections; receiving a cookie containing server address information from the second router, wherein the server address information identifies a server that is managed by the load-balancing device; and storing the server address information in the mapping of flow identifying information.

11. An apparatus for providing highly scalable network server load balancing, comprising: means for receiving, at a first router in a path from a client to one or more server sites, a packet of a request from a client; means for selecting a particular server site to process the client request; means for determining a first path from the first router through a network to a second router associated with the particular server site, and a second path from the client to a server load-balancing device associated with the second router; means for creating and storing a mapping of flow identifying information, associated with the packet, to a first multi-protocol label switching (MPLS) label value that identifies the first path and to a second MPLS label value that identifies the second path; means for storing the first MPLS label value and the second MPLS label value in the packet; means for distributing the first and second MPLS label values to the network by attaching the first and second MPLS label values to a discovery request packet that is sent into the network by the first router; means for forwarding all subsequent packets associated with the client request to the server load-balancing device based on looking up the first MPLS label value and second MPLS label value in the mapping, wherein the server load-balancing device does not terminate any TCP connections; means for receiving a cookie containing server address information from the second router, wherein the server address information identifies a server that is managed by the load-balancing device; and means for storing the server address information in the mapping of flow identifying information.

12. A load-balancing router for providing highly scalable network server load balancing, comprising: a network interface that is coupled to a data network for receiving one or more packet flows therefrom; a processor; one or more stored sequences of instructions for routing data from a client through one or more load-balancing nodes to a selected load-balanced server among a plurality of servers in a network and which, when executed by the processor, cause the processor to carry out the steps of: receiving, at a first router in a path from a client to one or more server sites, a packet of a request from a client; selecting a particular server site to process the client request; determining a first path from the first router through the network to a second router associated with the particular server site, and a second path from the client to a server load-balancing device associated with the second router; creating and storing a mapping of flow identifying information, associated with the packet, to a first multi-protocol label switching (MPLS) label value that identifies the first path and to a second MPLS label value that identifies the second path; storing the first MPLS label value and the second MPLS label value in the packet; distributing the first and second MPLS label values to the network by attaching the first and second MPLS label values to a discovery request packet that is sent into the network by the first router; forwarding all subsequent packets associated with the client request to the server load-balancing device based on looking up the first MPLS label value and second MPLS label value in the mapping, wherein the server load-balancing device does not terminate any TCP connections; receiving a cookie containing server address information from the second router, wherein the server address information identifies a server that is managed by the load-balancing device; and storing the server address information in the mapping of flow identifying information.

13. An apparatus as recited in claim 11, further comprising means for performing a global server load-balancing decision to result in selecting a particular server site to process the client request.

14. An apparatus as recited in claim 11, wherein the means for determining a first path further comprises means for performing a local server load-balancing decision to select the load-balancing device from among a plurality of load-balancing devices that are associated with the second router.

15. An apparatus as recited in claim 11, further comprising:
means for selecting a particular server load balancing device that is associated with the second router of the particular server site from among a plurality of server load balancing devices in the particular server site; and
means for storing, in the mapping of flow identifying information, the second MPLS label value that identifies a path from the first router to the selected server load balancing device.

16. An apparatus as recited in claim 11, further comprising:
means for receiving a cookie containing server address information from the second router; and
means for storing the server address information in the mapping of flow identifying information.

17. An apparatus as recited in claim 11, wherein the means for forwarding all subsequent packets further comprises:
means for receiving one or more subsequent packets associated with the client request at the second router;
means for extracting the first MPLS label value and second MPLS label value from the packets; and
means for forwarding the packets to the server load-balancing device based on the first MPLS label value and second MPLS label value.

18. A load balancing router as recited in claim 12, wherein the sequences of instructions comprise further instructions which when executed by the one or more processors cause performing a global server load-balancing decision to result in selecting a particular server site to process the client request.

19. A load balancing router as recited in claim 12, wherein the step of determining a first path comprises performing a local server load-balancing decision to select the load-balancing device from among a plurality of load-balancing devices that are associated with the second router.

20. A load balancing router as recited in claim 12, wherein the sequences of instructions comprise further instructions which when executed by the one or more processors cause:
  selecting a particular server load balancing device that is associated with the second router of the particular server site from among a plurality of server load balancing devices in the particular server site; and
  storing, in the mapping of flow identifying information, the second MPLS label value that identifies a path from the first router to the selected server load balancing device.

21. A load balancing router as recited in claim 12, wherein the sequences of instructions comprise further instructions which when executed by the one or more processors cause:
  receiving a cookie containing server address information from the second router; and
  storing the server address information in the mapping of flow identifying information.

22. A load balancing router as recited in claim 12, wherein the step of forwarding all subsequent packets comprises:
  receiving one or more subsequent packets associated with the client request at the second router;
  extracting the first MPLS label value and second MPLS label value from the packets; and
  forwarding the packets to the server load-balancing device based on the first MPLS label value and second MPLS label value.

* * * * *